United States Patent
Ning

(10) Patent No.: US 8,873,167 B2
(45) Date of Patent: Oct. 28, 2014

(54) WIDE-ANGLE LENSES WITH REDUCED GHOST REFLECTIONS

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 0 days.

(21) Appl. No.: 14/072,670

(22) Filed: Nov. 5, 2013

(65) Prior Publication Data

US 2014/0126070 A1 May 8, 2014

Related U.S. Application Data

(60) Provisional application No. 61/819,378, filed on May 3, 2013, provisional application No. 61/723,712, filed on Nov. 7, 2012, provisional application No. 61/837,398, filed on Jun. 20, 2013.

(51) Int. Cl.

| G02B 9/00 | (2006.01) |
|---|---|
| G02B 9/08 | (2006.01) |
| G02B 13/04 | (2006.01) |
| G02B 13/06 | (2006.01) |
| G02B 27/00 | (2006.01) |

(52) U.S. Cl.
CPC ............ *G02B 13/04* (2013.01); *G02B 13/06* (2013.01); *G02B 27/0018* (2013.01)
USPC .......................................... 359/740

(58) Field of Classification Search
CPC ...... G02B 13/02; G02B 13/18; G02B 15/177; G02B 9/16
USPC ................. 359/717, 739, 740, 745–795
See application file for complete search history.

(56) References Cited

U.S. PATENT DOCUMENTS

| 4,537,476 | A | 8/1985 | Nanjo |
|---|---|---|---|
| 5,861,999 | A | 1/1999 | Tada |
| 7,826,151 | B2 | 11/2010 | Tsai |
| 7,864,452 | B2 | 1/2011 | Ning |
| 8,254,040 | B2 | 8/2012 | Peng et al. |
| 8,264,783 | B2 | 9/2012 | Peng et al. |
| 8,416,510 | B2 | 4/2013 | Kubota et al. |
| 8,416,512 | B2 | 4/2013 | Harada et al. |
| 2012/0026285 | A1 | 2/2012 | Yoshida et al. |
| 2013/0128369 | A1 | 5/2013 | Kim |

FOREIGN PATENT DOCUMENTS

EP     0107893     5/1984

*Primary Examiner* — Mahidere Sahle
(74) *Attorney, Agent, or Firm* — Mark Wisnosky

(57) ABSTRACT

Low ghosting wide-angle lens designs are presented. The dimensions and materials are selected such that the lens has a field of view of at least 145 degrees, f# of 2.2-2.9 and all secondary images of an object imaged on the image plane are focused such that they fall either outside of the image plane thus having a relative intensity that is less than $10^{-4}$ times the intensity of the primary image.
In one embodiment a set of conditional expressions are all met. In another embodiment the conditional expressions are all met and the conditional expressions related to the physical size of the lens is narrowed. In another embodiment five and seven element designs are produced.

24 Claims, 13 Drawing Sheets

WIDE-ANGLE LENSES WITH REDUCED GHOST REFLECTIONS

CROSS-REFERENCE TO RELATED APPLICATIONS

This application claims priority to U.S. Provisional Application 61/819,378 titled Wide-angle lenses with reduced ghost reflections, filed May 3, 2013 and to U.S. Provisional Application 61/723,712, titled Wide-angle lenses with reduced ghost reflections, filed Nov. 7, 2012 and to U.S. Provisional Application 61/837,398 titled Wide-angle lenses with reduced ghost reflections, filed Jun. 20, 2013. All of the Provisional applications are from the same inventor as this application and are currently pending.

BACKGROUND OF THE INVENTION

1. Technical Field

The present invention relates to a lens system that reduces or eliminates ghost images.

2. Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. Another important characteristic is to produce images that are free of secondary ghost images caused by double reflections within the imaging system including the surfaces of the internal lens elements, any filters and the cover glass of the imaging sensor. This requirement can be especially important when the sun or other bright source is included in the image field of view. The lenses are increasingly being incorporated into a variety of electronic devices including mobile phones, cameras, sports cameras, computers and computer peripherals. Incorporation of the lenses into new devices also places new environmental performance requirements upon the lens. The lens must be compact and light, to be used in portable devices, and must maintain the high performance characteristics.

A common fault of wide-angle lens is the appearance of secondary images. Wide-angle lenses are more prone to have ghost reflections. Every transition of light ray across a material boundary where the materials have different refractive indices can produce a partial reflection of the light. In a typical digital imaging system these transitions are between air and the lens material and occur at every lens boundary as well as at the surfaces of filters and imager cover glasses. When these secondary reflections form an image on the image sensor a ghost image is produced. Current technology to reduce or eliminate ghost images includes the design of the lens, the material used for the lens and other elements in the imaging system and coatings that are applied to the lenses and other elements. There is still a need for improved performance especially in cases where very bright objects are included in the field of view of the lens. It is an object of this invention to provide wide-angle lenses with reduced ghost reflections and thus providing an improved image quality over a wide range of lighting conditions including those having the sun within the field of view of the lens. It is also an objective that the lens design is compact such that it can be fit into small electronic devices.

DISCLOSURE OF THE INVENTION

A wide-angle lens that reduces the intensity of a secondary or ghost image is reported. The wide-angle lenses of the present invention utilize three groups of lens elements G1, G2 and G3. The first or front group (G1) comprises two lens elements (L1 and L2). All G1 group elements have negative power. The first element (L1) in the G1 group is a meniscus element having a convex object surface and a concave image surface. The object surface of a lens element is defined as the lens surface facing the object side (the left side surface of all elements in the drawings). The image surface is defined as the element surface facing the image side (the right side surface of all elements in the drawings). The second element (L2) in the G1 group has a concave image surface S4. In preferred embodiments, the object surface S3 of the second element is aspheric shape with a vertex radius being either infinity or positive. Lens curvature reported as radii are measured with the origin on the image side using notation known in the art. The notation used here is as used in the optical analysis software as such Zemax® (Zemax is a registered trademark of Radiant Zemax, LLC).

The second group (G2) has positive power and comprises lens element L3. In a preferred embodiment it is made from a flint material having a high index of refraction and a low Abbe number.

An aperture stop S7 and also labeled STO is positioned between the lens groups G2 and G3.

The third group (G3) has positive power. It comprises a doublet lens. In preferred embodiments, it has three lens elements (L4, L5 and L6). The L4 is a positive element having a double convex shape. L5 is a negative element. L4 and L5 are cemented optically to form a doublet. L6 is a positive element with convex image surface. In another embodiment the third group is comprised of two elements that are cemented together to form a doublet. In another embodiment the third group is comprised of four lens elements.

The profiles of the lens element surfaces in the lens groups, G1, G2 and G3 are chosen such that the ghost images caused by the double reflections among the surfaces in the optical system including filters and the surfaces of the sensor cover glass are out of focus on the imaging surface of the sensor. In another embodiment anti-reflection (AR) coatings are applied to these surfaces to reduce the intensity of the reflection. An excellent AR coating can reduce the reflection intensity from about 4-5% to 0.5% averaging over the visible spectrum. On the primary image plane, the out of focus ghost images have non-uniform intensity distribution. The intensity distribution for lens designs can be calculated using modern optical analysis software as such Zemax®, (Zemax is a registered trademark of Radiant Zemax, LLC). The designs reported here reduce the ratio of a ghost image peak intensity to the peak intensity of the primary image to less than $10^{-4}$. In preferred embodiments, this ratio is less than $10^{-6}$.

In one embodiment, where the third group is comprised of three lens elements, the image surface of lens element 5 is a convex surface and the absolute ratio of radius of curvature of the image side surface S10 of lens element 5 to the effective focal length of the entire lens assembly is between 1.5 and 2.5.

In a preferred embodiment, the following conditional expressions are satisfied:

$$V3 \text{ and } V5 < 24 \qquad (1)$$

V3 and V5 are the Abbe numbers of the lens element in the second group L3, and the negative lens element of the doublet in the $3^{rd}$ group. From this point on, V5 is defined as the Abbe number of the negative element in the doublet of the $3^{rd}$ group. N5 is defined as the refractive index at d-line of the negative element in the doublet of the $3^{rd}$ group. In the preferred embodiment, $$V5<21 \quad (2)$$

If (1) and (2) are violated the correction of chromatic aberrations becomes difficult.

$$N3 \text{ and } N5>1.8 \quad (3)$$

N3 and N5 are the refractive indices (at d-line) of the lens element in the second group L3. In the preferred embodiment, $$N5>1.9 \quad (4)$$

$$7=<TTL/EFL=<20 \quad (5)$$

Where TTL is the total track length of the wide-angle lens at the vertex when the lens is focused at infinity. EFL is the effective focal length of the lens assembly.

The field of view of all embodiments is 145 degrees or greater and the f# of the lenses as described is about 2.8 or lower≠.

BRIEF DESCRIPTION OF THE DRAWINGS

FIGS. 1-11 are all comprised of six lens elements.

MODES FOR CARRYING OUT THE INVENTION

Figure 1:
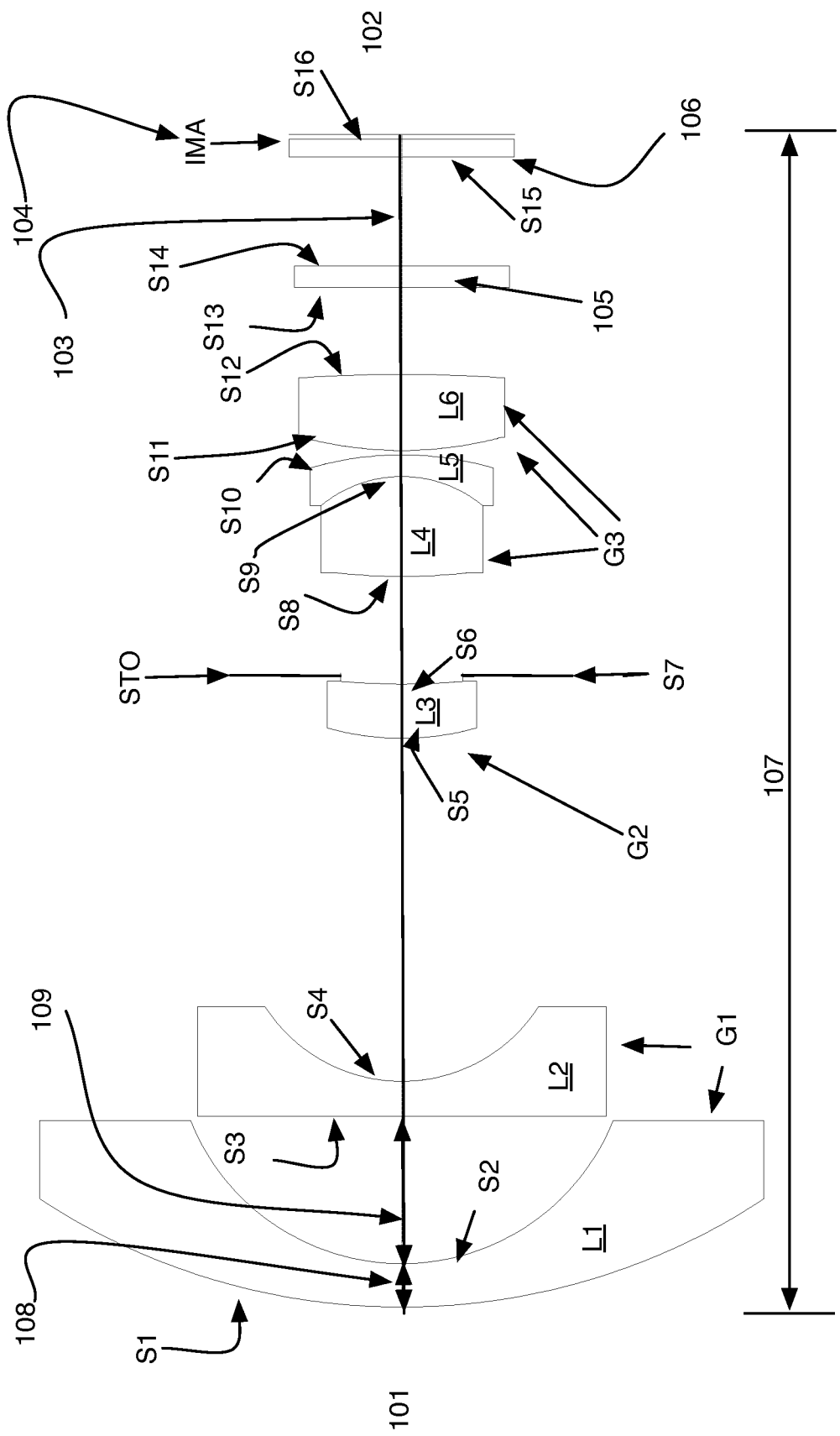
FIG. 1 is a diagram for a first embodiment of a wide-angle lens with reduced ghost reflections and also showing the nomenclature used generally throughout the description.
Figure 12:
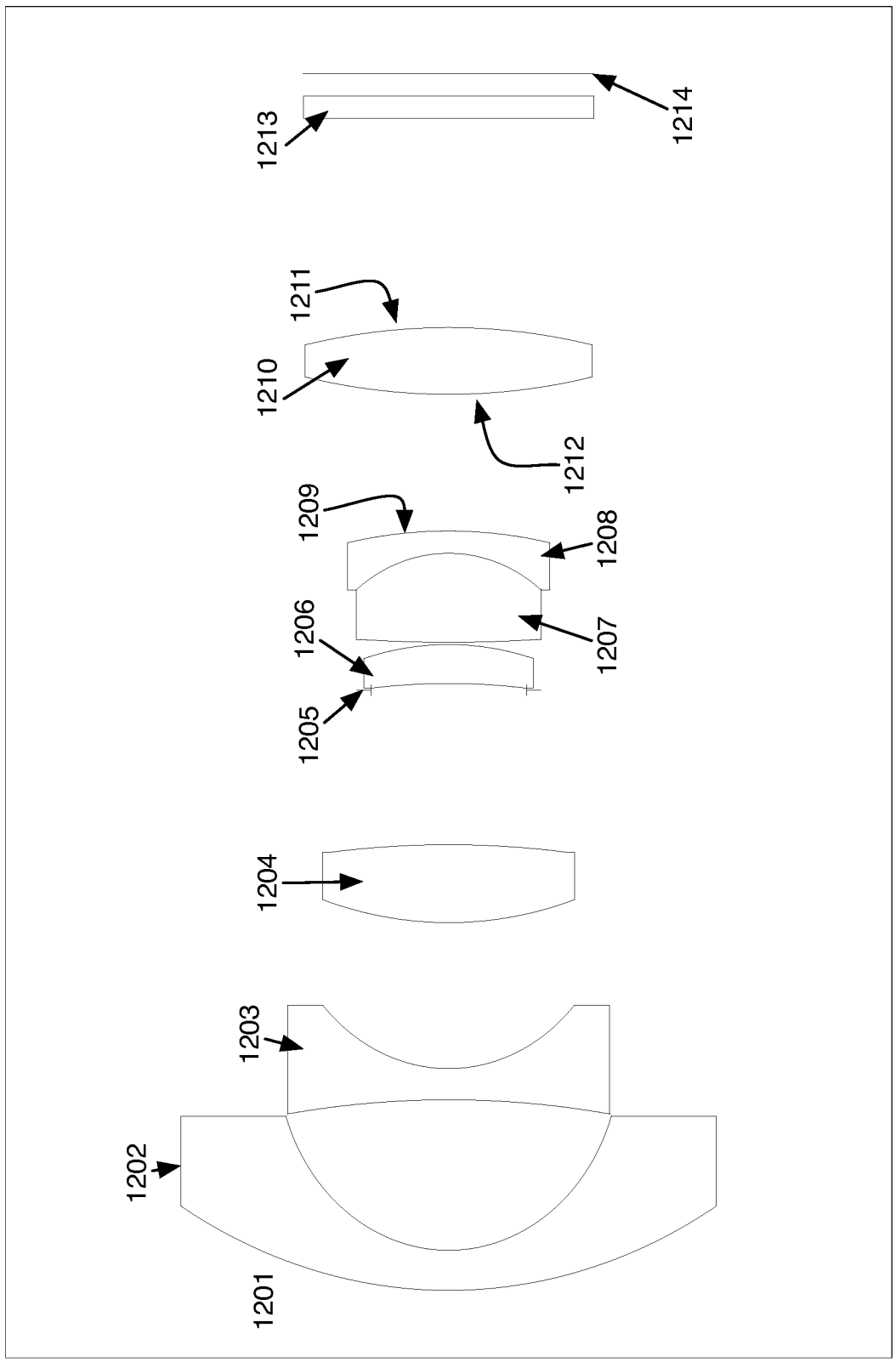
FIG. 12 is a diagram of a twelfth embodiment comprised of seven lens elements.
Figure 13:
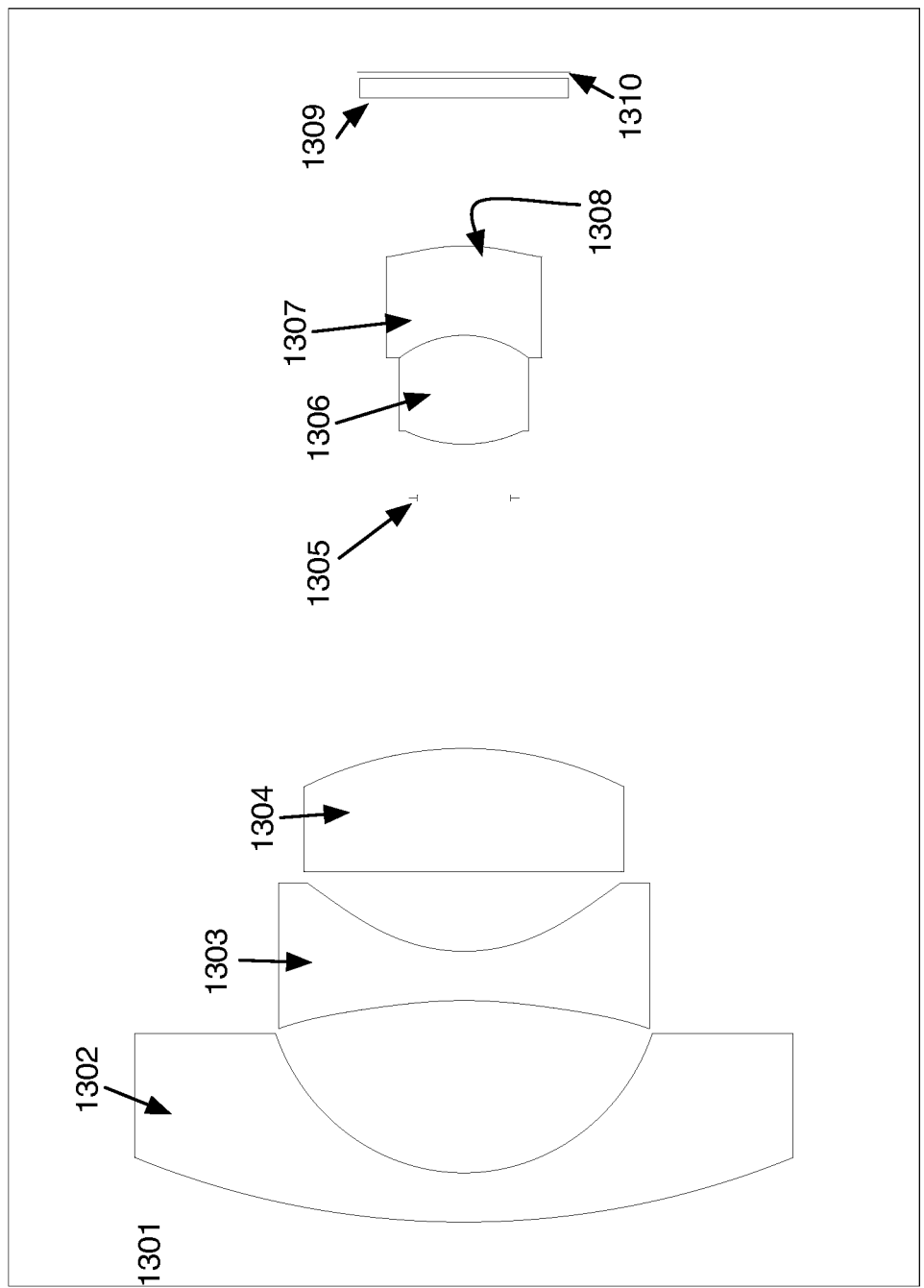
FIG. 13 is a diagram of a thirteenth embodiment comprised of five lens elements.

Referring now to FIG. 1, the elements common to all of the examples and the nomenclature used in all subsequent examples are described. The wide-angle lens is comprised of lens elements, here labeled L1 through L6. The lens elements are divided into three groups G1, G2, G3. Lens elements L1 and L2 comprise the first group G1. A second group G2 is comprised of lens element L3 and a third group is comprised of a doublet lens (L4, L5), and L6 in FIG. 1-11. In FIG. 12, the $3^{rd}$ group is comprised of a doublet lens (L5 and L6) and two additional singlet lens elements (L4 and L8). In FIG. 13, the third group has only a doublet lens (L4 and L5). Lens elements and groups are ordered from object 101 to image 102. Thicknesses, associated with each surface, are reported. The thickness is the distance from the surface in question to the next enumerated surface measured from the vertex of each surface. The thickness 108 associated with S1 and is the distance to the next surface S2. The thickness 109 associated with surface S2 is the distance to the next surface S3. Each of the surfaces are numbered S1, S2, S3, etc. and ordered sequentially from object 101 to image 102. A single surface S7 is associated with the aperture stop labeled STO. The thickness and curvature values reported later are all positioned along the optical axis 103. Also seen in the system are two flat elements 105, 106. The first 105 is a filter element and the second 106 is the cover glass for the image sensor 104 also labeled IMA. The flat elements 105, 106 are not required to meet the reported performance characteristics of the wide-angle lens, but can contribute to detrimental performance in providing additional reflective elements and therefore sources of ghost images. Reported performance includes these elements.

The following specific examples all have the elements common to that shown in FIG. 1. Specific values for the lens elements and their placement vary from embodiment to embodiment while still maintaining the performance characteristics of a wide-angle lens (field of view 145 degrees or greater), low ghosting (relative intensity of secondary images less than $10^{-4}$ times the intensity of the most intense image features) and f# about 2.8 or less. All of the embodiments are comprised of a lens having a field of view of at least 145 degrees said lens forming primary and secondary images, said images having focal planes and peak intensities, said lens comprising lens elements, said lens elements made of materials and having dimensions and locations, wherein the materials, dimensions and locations of the lens elements are selected such that the focal plane of the secondary images are not coincident with the focal plane of the primary image.

Examples 1-5

Examples 1 through 5 represents designs that all meet all of the conditional expressions (1) through (5) listed above.

Example 1

Still referring to FIG. 1 the optical layout of the first example is shown. Counting from the left side, which is also the object side 101 and proceeding to the image end 102, the wide-angle lens is comprised of lens elements L1-L6 arranged in three groups G1, G2, G3. The optical axes of the lens elements L1-L6 are aligned along the optical axis 103 of the wide-angle lens. In addition to the lens elements there is also an optical filter 105, a cover plate 106 for the image sensor 104 also labeled IMA. The image sensor 104 is located at the focal plane of the wide-angle lens. The total track length of the lens 107 is also shown. The first element L1 is a meniscus lens with negative power. The first element has a convex object surface S1 and a concave object surface S2. The second element L2 has negative power and a concave image surface S4. In preferred embodiments, this element L2 is a plano-concave element having a flat object surface S3. The third element L3 is a member of the second lens group G2 and has a positive power having a meniscus, plano-convex or as in the example shown double convex shape. Both lens surfaces S5, S6 are convex. The aperture stop STO, also identified as S7 follows the $3^{rd}$ element L3. The fourth element L4 and fifth elements L5 form a cemented doublet where the power of the fourth element is positive and fifth negative. The image surface S10 of the fifth element L5 is flat or convex. Here it is convex. The common surface S9 of the cemented doublet has a negative radius of curvature. The object surface S8 of the fourth lens element L4 is convex. The sixth element L6 has a positive power preferably having a double convex or plano-convex shape. There the object surface S11 is flat or convex and the image surface S12 is convex. The next flat element 105 represents an optical filter, for example, an IR cut-off or optical low-pass filter. The surfaces S13, S14 of the filter are flat. The last flat element 106 in front of the image plane 104, IMA, the right most surface is the cover glass of the sensor. The cover glass surfaces S15, S16 are also flat. The first group G1 comprises L1-L2 having negative power. The second group G2 comprises L3 having positive power. The third group G3 comprises L4-L6 having positive power. Surface S10 and S11 are chosen such as the ghost images formed between them and the two surfaces of the sensor cover glass S15, S16 are out of the focus on the image plane. The intensity ratio of the ghost images to the primary image is less than $10^{-5}$.

Table 1 shows the detailed prescription of this example. This table follows the conventions used by Zemax® optical design software. This design is capable of imaging over a field of view (FOV) at least 185 degrees with f/#=2.4 relative aperture. The example prescription shown in the following table has an effective focal length of 1.83 mm. This prescription is scalable to a different focal length while maintaining the same FOV and F/# values. The table gives for each surface identified consistently with the notation of FIG. 1, the type of surface (Type) as either standard flat or circular radius of curvature Labeled STD. or as an aspheric surface labeled as ASPH. All surfaces in this example are standard. The Radii of curvature are given in units of mm, as is the thickness. The radius of curvature is measured at the intersection of each surface with the optical axis 103 of the wide-angle lens. Thickness is defined as the distance from the surface to the next labeled surface measured along the optical axis. For example in the Table 1 the thickness 108 of the lens element L1, the distance between the first S1 and the second S2 surface of that lens element is 1.00 mm and the distance 109 from the image side surface S2 to surface S3 is 3.40 mm. Index is the index of refraction and Abbe # is the Abbe Number for the lens element corresponding to the designated surface at 578 nm (d-line). For example, the index of refraction of the first lens element L1 is 1.773 and the Abbe Number of the first element L1 is 49.61. The focal length is 1.83 mm for the design parameters listed. The design may be scaled for a lens of any focal length.

TABLE 1

Prescription for Example 1

| Surface | Type | Radius (mm) | Thickness (mm) | Index | Abbe# |
|---|---|---|---|---|---|
| OBJ | STD. | Infinity | Infinity | 0.000 | 0.00 |
| S1 | STD. | 15.066 | 1.00 | 1.773 | 49.61 |
| S2 | STD. | 5.203 | 3.40 | | |
| S3 | STD. | Infinity | 0.80 | 1.618 | 63.42 |
| S4 | STD. | 3.711 | 7.90 | | |
| S5 | STD. | 6.193 | 1.25 | 1.847 | 23.79 |
| S6 | STD. | 16.321 | 0.16 | | |
| STO | STD. | Infinity | 2.31 | | |
| S8 | STD. | 13.748 | 2.30 | 1.618 | 63.42 |
| S9 | STD. | −2.898 | 0.50 | 1.923 | 20.88 |
| S10 | STD. | −7.347 | 0.10 | | |
| S11 | STD. | 8.783 | 1.75 | 1.623 | 56.95 |
| S12 | STD. | −34.902 | 2.00 | | |
| S13 | STD. | Infinity | 0.50 | 1.517 | 64.21 |
| S14 | STD. | Infinity | 2.51 | | |
| S15 | STD. | Infinity | 0.40 | 1.517 | 64.17 |
| S16 | STD. | Infinity | 0.13 | | |
| IMA | STD. | Infinity | | | |

The prescription is seen to satisfy the design parameters. The following conditional expressions are satisfied:

$$V3 \text{ and } V5 < 24 \quad (1)$$

V3 is 23.79 and V5 is 20.88 are the Abbe numbers of the lens element in the second group L3 and the middle lens element L5 in the $3^{rd}$ group respectively. In the preferred embodiment, $$V5 < 21 \quad (2)$$

$$N3 \text{ and } N5 > 1.8 \quad (3)$$

N3 is 1.847 and N5 is 1.923 are the refractive indices (at d-line) of the lens element in the second group L3 and the middle lens element in the $3^{rd}$ group L5 respectively. In the preferred embodiment, $$N5 > 1.9 \quad (4)$$

The index of the middle element of the $3^{rd}$ group is greater than 1.9. The wide-angle lens of the Example 1 also satisfies the following condition:

$$7 =< TTL/EFL =< 20 \quad (5)$$

Where TTL 107 is the total track length, distance from the vertex of the object side of the first lens to the image plane when the lens is focused at infinity; the sum of the thickness values in the table or 32.17 mm. The ratio of TTL to EFL is 17.6 where EFL is the effective focal length of the lens assembly.

Example 2

Figure 2:
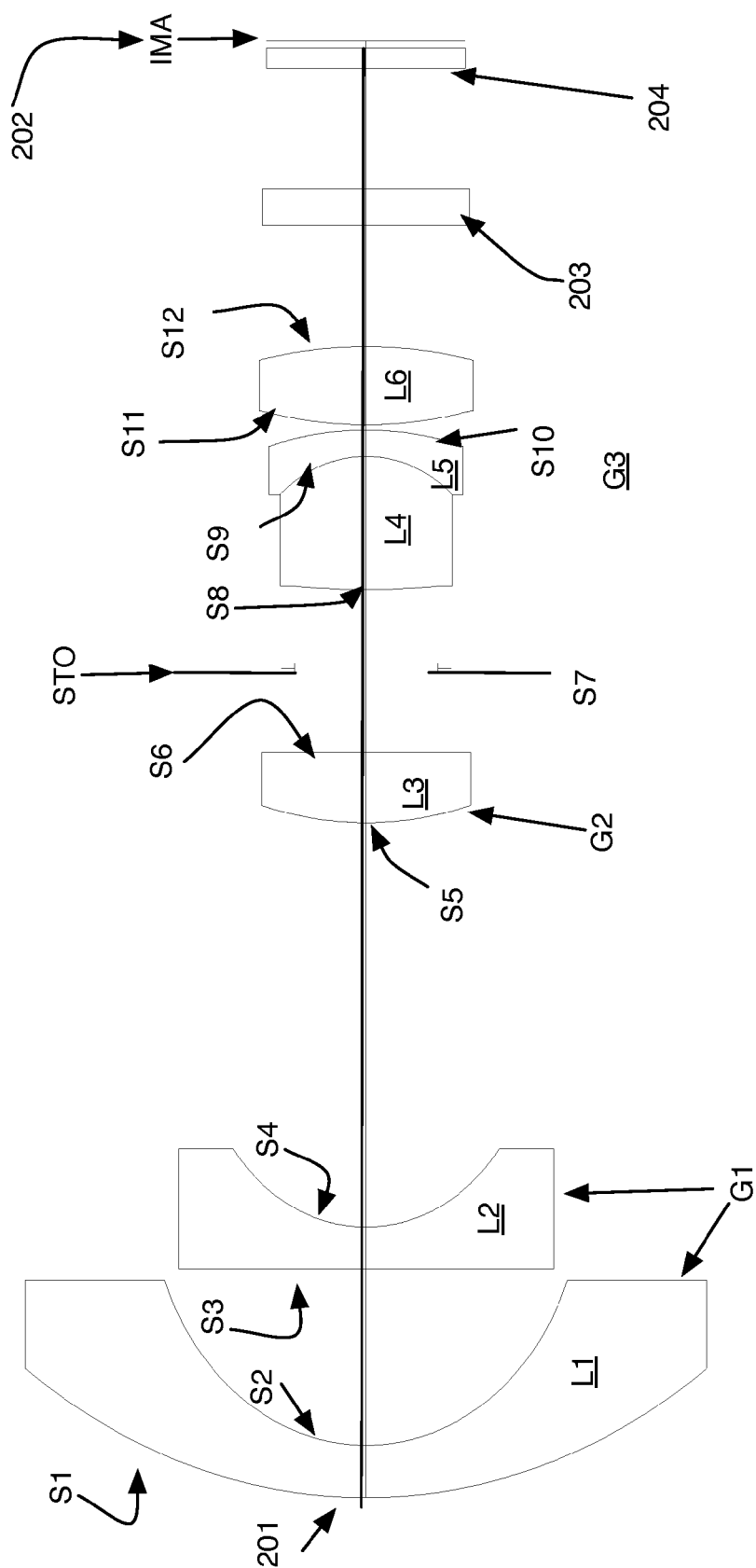
FIG. 2 is a diagram of a second embodiment.

Referring to FIG. 2 a second exemplary embodiment is shown. Counting from the left side 201, which is also the object side, the first element L1 is a meniscus lens with negative power. The first element has a convex object surface S1 and a concave image surface S2. The second element L2 has negative power having a concave image surface S4. In preferred embodiments, this element is a plano-concave element having a flat object surface S3. The third element L3 has a positive power having a meniscus, plano-convex or double convex shape. In the example in FIG. 2, the third element L3 is plano-convex. The object surface is convex and the image surface S6 is planar. The aperture stop STO follows the $3^{rd}$ element L3. The fourth element L4 and fifth element L5 form a cemented doublet where the power of the fourth element is positive and fifth negative. The image surface S10 of the fifth element is flat or convex. In the Figure shown it is convex. The object side S8 of the fourth element L4 is convex and the image side S9 of the fourth element is convex. Making the object side of the fifth element also S9 concave. The sixth element L6 has a positive power preferably having a double convex or plano-convex shape. In the example of FIG. 2 it is double convex: the object surface S11 is convex as is the image surface S12. The next flat element 203 represents an optical filter, for example, an IR cut-off or optical low-pass filter. The last flat element 204 in front of the image plane is the cover glass of the sensor 202. The first group G1 comprises L1-L2 having negative power. The second group G2 comprises L3 having positive power. The third group G3 comprises L4-L6 having positive power. The image surface S10 of the fifth element L5 and the object surface S11 of the sixth element L6 are chosen such as the ghost images formed between them and the two surfaces of the sensor cover glass are out of the focus on the image plane. The intensity ratio of the ghost images to the primary image is less than $10^{-5}$.

Table 2 shows the detailed prescription of this example. This table follows the conventions used by Zemax optical design software and the interpretation of the table is the same as already discussed in conjunction with Table 1. This design is capable of imaging over a field of view (FOV) at least 180 degrees with f/#=2.0 relative aperture. The example prescription shown in the following table has an effective focal length of 1.61 mm. This prescription is scalable to a different focal length while maintaining the same FOV and F/# values.

TABLE 2

Prescription for Example 2

| Surface | Type | Radius (mm) | Thickness (mm) | Index | Abbe |
|---|---|---|---|---|---|
| OBJ | STD. | Infinity | Infinity | | |
| S1 | STD. | 13.545 | 1.00 | 1.804 | 46.57 |
| S2 | STD. | 4.939 | 3.38 | | |
| S3 | STD. | Infinity | 0.80 | 1.773 | 49.61 |
| S4 | STD. | 3.839 | 7.74 | | |
| S5 | STD. | 8.621 | 1.36 | 1.847 | 23.79 |
| S6 | STD. | Infinity | 1.60 | | |
| STO | STD. | Infinity | 1.51 | | |
| S8 | STD. | 21.189 | 2.55 | 1.618 | 63.42 |
| S9 | STD. | −3.006 | 0.50 | 1.923 | 20.88 |
| S10 | STD. | −8.007 | 0.10 | | |
| S11 | STD. | 10.760 | 1.50 | 1.618 | 63.42 |
| S12 | STD. | −11.633 | 2.32 | | |
| S13 | STD. | Infinity | 0.70 | 1.517 | 64.21 |
| S14 | STD. | Infinity | 2.30 | | |
| S15 | STD. | Infinity | 0.40 | 1.517 | 64.17 |
| S16 | STD. | Infinity | 0.13 | | |
| IMA | STD. | Infinity | | | |

As before, Example 2 satisfies the parametric equations (1)-(5).

Example 3

Figure 3:
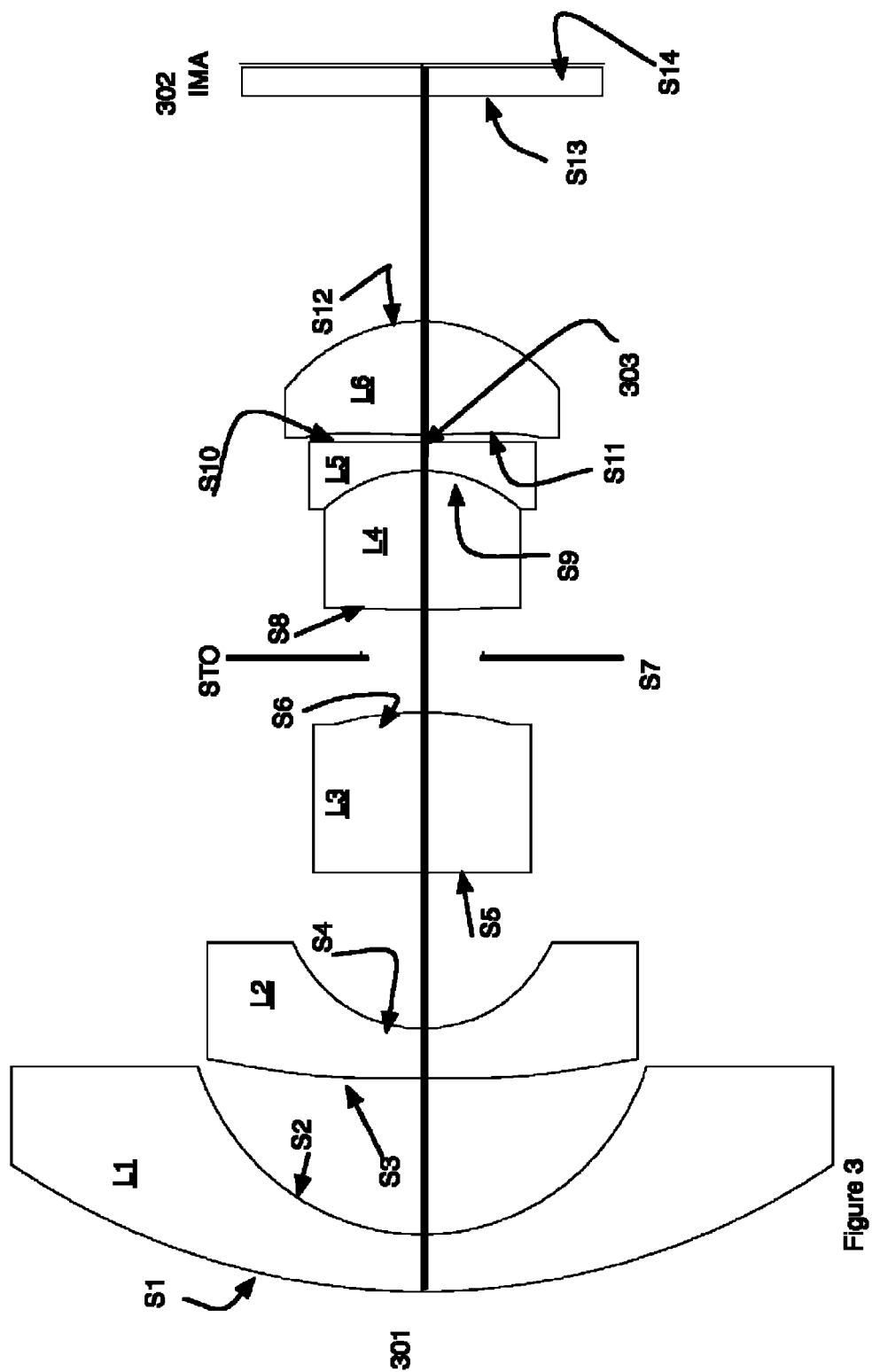
FIG. 3 is a diagram of a third embodiment.

FIG. 3 shows the optical layout of Example 3. Counting from the left side 301, which is also the object side, the first element L1 is a meniscus lens with negative power. The object side S1 is convex and the image side S2 is concave. The second element L2 has negative power having a concave image surface S4. The object surface S3 is a convex aspheric surface with a nearly flat vertex radius of 188 mm. The image surface S4 is concave and also aspheric. The third element L3 has a positive power having a meniscus, plano-convex or double convex shape. In the example of FIG. 3 the third element L3 is plano-convex. The object surface S5 is planar and the image surface S6 is convex. The aperture stop STO follows the $3^{rd}$ element. The fourth element L4 and fifth elements L5 form a cemented doublet where the power of the fourth element is positive and fifth negative. The image surface S11 of the fifth element is flat. The object surface S8 of the fourth element L4 is convex. The shared surface S9, which is the image surface for L4 and the object surface for L5 has a negative radius. The sixth element L6 has a positive power. The object surface S11 of the sixth element L6 is convex and aspheric and the image surface S12 is convex and aspheric. The last flat element 302 in front of the image plane (the right most surface) is the cover glass of the sensor. The first group comprises L1-L2 having negative power. The second group comprises L3 having positive power. The third group comprises L4-L6 having positive power. The object surface S3 of the second element L2, the image surface S10 of the fifth element and the object surface S11 of the sixth element L6 are chosen such as the ghost images formed between them and the two surfaces S13, S14 of the sensor cover glass are out of the focus on the image plane. The intensity ratio of the ghost images to the primary image is less than $10^{-5}$.

Tables 3A and 3B shows the detailed prescription of this example. This table follows the conventions used by Zemax optical design software. The details of the table are as already discussed in conjunction with Tables 1 and 2. The radius values are for the curvature of the lens element at the apex of the lens or also stated at the intersection of the lens surface and the optical axis. This point of intersection 303 for the fifth lens element L5 is shown in FIG. 3. This third example includes aspheric lens elements whose descriptions are given in Table 3B. It is important to note that a lens element may be described in the radius column as having an infinite radius of curvature and thus the lens is described as "flat" and yet the lens is aspheric, as is the fifth lens element L5 in this third example. The surface is therefore flat at the vertex but not flat away from the vertex where the curvature away from the vertex is given by the equation 5 and the parameters of Table 3B. This design is capable of imaging over a field of view (FOV) at least 180 degrees with f/#=2.2 relative aperture. The example prescription shown in the following table has an effective focal length of 1.38 mm. This prescription is scalable to a different focal length while maintaining the same FOV and F/# values.

TABLE 3a

Optical Prescription of Example 3

| Surface | Type | Radius (mm) | Thickness (mm) | Index | Abbe |
|---|---|---|---|---|---|
| OBJ | STD. | Infinity | Infinity | 0.000 | 0.000 |
| S1 | STD. | 11.165 | 0.800 | 1.788 | 47.508 |
| S2 | STD. | 3.500 | 2.201 | | |
| S3 | ASPH | 188.543 | 0.700 | 1.535 | 56.197 |
| S4 | ASPH | 2.297 | 2.191 | | |
| S5 | STD. | Infinity | 2.258 | 1.847 | 23.791 |
| S6 | STD. | −4.925 | 0.795 | | |
| STO | STD. | Infinity | 0.653 | | |
| S8 | STD. | 27.946 | 1.953 | 1.883 | 40.807 |
| S9 | STD. | −2.200 | 0.400 | 1.923 | 20.882 |
| S10 | STD. | Infinity | 0.106 | | |
| S11 | ASPH | 15.000 | 1.591 | 1.535 | 56.197 |
| S12 | ASPH | −2.534 | 3.172 | | |
| S13 | STD. | Infinity | 0.400 | 1.516 | 64.115 |
| S14 | STD. | Infinity | 0.065 | | |
| IMA | STD. | Infinity | | | |

Unlike example 1 and 2, some surfaces in example 3 are aspherical, marked with "ASPH" label in the above table. The aspherical profile is described by the following equation:

$$z = \frac{cr^2}{1 + \sqrt{1 - (1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \quad (6)$$

Where z is the sag height measured from the vertex at radial distance of r. C is the curvature of the surface. K is the conic constant and the alphas are the aspheric coefficients. This equation applies to all following examples where aspherical surfaces are provided. The detailed aspheric coefficients are given in Table 3B.

TABLE 3B

Aspheric coefficients for Example 3.

Surface S3

| Coeff r2 | 0.0000E+00 |
|---|---|
| Coeff r4 | 6.5903E−03 |
| Coeff r6 | −5.6318E−04 |
| Coeff r8 | 1.4416E−05 |
| Coeff r10 | 0.0000E+00 |
| Coeff r12 | 0.0000E+00 |
| Coeff r14 | 0.0000E+00 |

TABLE 3B-continued

Aspheric coefficients for Example 3.

| | |
|---|---|
| Coeff r16 | 0.0000E+00 |
| Surface S4 | |
| Coeff r2 | 0.0000E+00 |
| Coeff r4 | 8.5372E−03 |
| Coeff r6 | 1.3396E−03 |
| Coeff r8 | 0.0000E+00 |
| Coeff r10 | 0.0000E+00 |
| Coeff r12 | 0.0000E+00 |
| Coeff r14 | 0.0000E+00 |
| Coeff r16 | 0.0000E+00 |
| Surface S11 | |
| Coeff r2 | 0.0000E+00 |
| Coeff r4 | −1.3492E−02 |
| Coeff r6 | −7.3674E−04 |
| Coeff r8 | 0.0000E+00 |
| Coeff r10 | 0.0000E+00 |
| Coeff r12 | 0.0000E+00 |
| Coeff r14 | 0.0000E+00 |
| Coeff r16 | 0.0000E+00 |
| Surface S12 | |
| Coeff r2 | 0.0000E+00 |
| Coeff r4 | 3.3931E−03 |
| Coeff r6 | −6.3273E−05 |
| Coeff r8 | 0.0000E+00 |
| Coeff r10 | 0.0000E+00 |
| Coeff r12 | 0.0000E+00 |
| Coeff r14 | 0.0000E+00 |
| Coeff r16 | 0.0000E+00 |

As before, Example 3 satisfies the parametric equations (1)-(5).

Example 4

Figure 4:
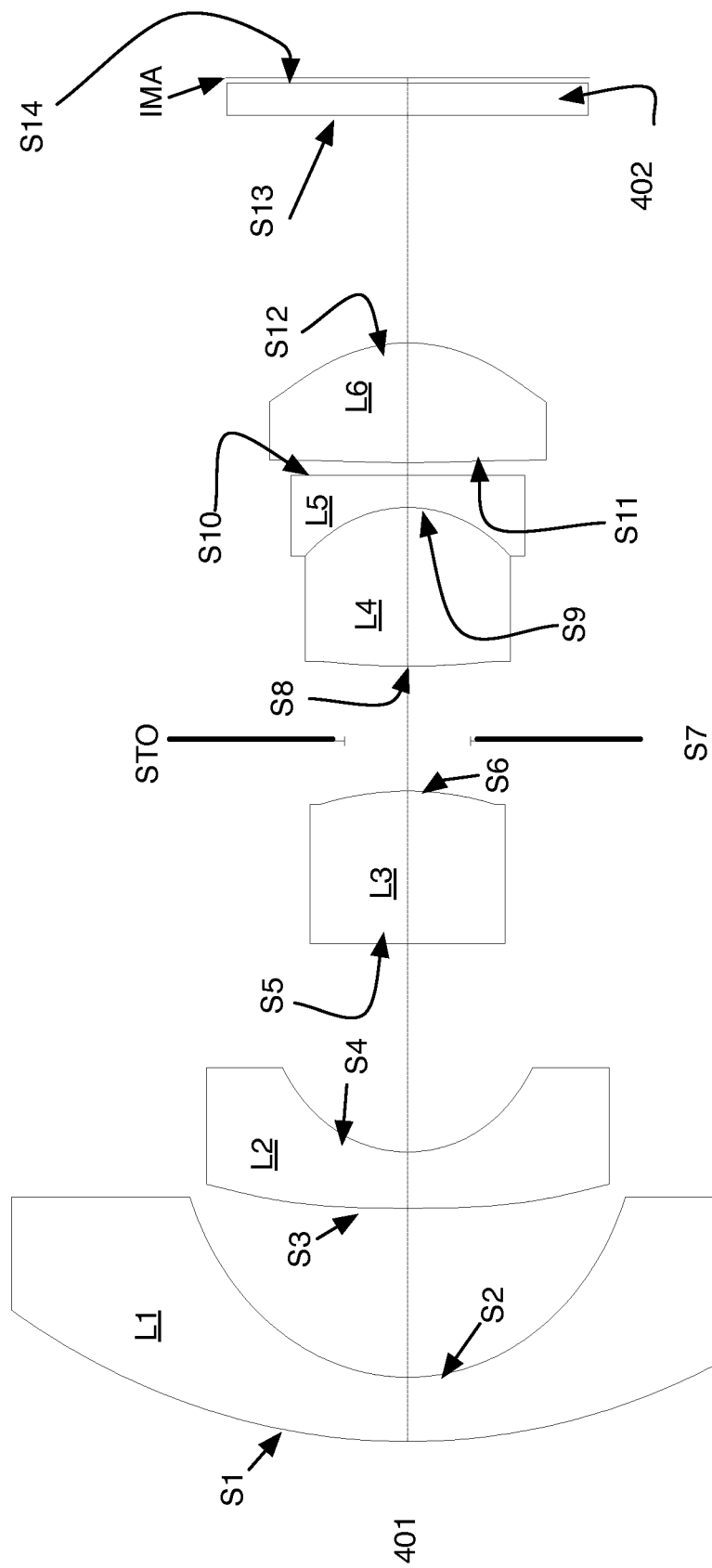
FIG. 4 is a diagram of a fourth embodiment.

FIG. 4 shows the optical layout of Example 4. Counting from the left side 401, which is also the object side, the first element L1 is a meniscus lens with negative power having a convex object surface S1 and a concave image surface S2. The second element L2 has negative power having a convex object surface S3 and a concave image surface S4. The object surface S3 is a convex aspheric surface with a nearly flat vertex radius. The third element L3 has a positive power having a meniscus, plano-convex or double convex shape. In the example of FIG. 4 the third element is a plano-convex element having a planar object surface S5 and a convex image surface S6. The aperture stop (STO, S7) follows the $3^{rd}$ element. The fourth element L4 and fifth elements L5 form a cemented doublet where the power of the fourth element is positive and fifth negative. The image surface S10 of the fifth element is flat. The object surface of the fourth element is convex and the shared surface S9 has a negative radius. The sixth element L6 has a positive power. In the example of FIG. 4 the sixth element L6 is a double convex lens. Both surfaces S11, S12 are convex. The last flat element in front of the image plane (the right most surface) is the cover glass of the sensor IMA. The first group comprises L1-L2 having negative power. The second group comprises L3 having positive power. The third group comprises L4-L6 having positive power. Surfaces in group G1, G2 and G3 are chosen such as the ghost images formed between them and the two surfaces of the sensor cover glass S13, S14 are out of the focus on the image plane. The intensity ratio of the ghost images to the primary image is less than $10^{-5}$.

FIG. 4 Optical Layout of Example 4

Table 4A and Table 4B show the detailed prescription of this example. This table follows the conventions used by Zemax optical design software. The details of the table are as already discussed in conjunction with Tables 1 and 2. This third example includes aspheric lens elements whose descriptions are given in Table 4B. This design is capable of imaging over a field of view (FOV) at least 180 degrees with f/#=2.2 relative aperture. The example prescription shown in the following table has an effective focal length of 1.38 mm. This prescription is scalable to a different focal length while maintaining the same FOV and F/# values.

TABLE 4a

Optical Prescription of Example 4

| Surface | Type | Radius | Thickness | Index | Abbe |
|---|---|---|---|---|---|
| OBJ | STD. | Infinity | Infinity | 0.000 | 0.000 |
| S1 | STD. | 11.331 | 0.800 | 1.773 | 49.613 |
| S2 | STD. | 3.435 | 2.103 | | |
| S3 | ASPH. | 39.200 | 0.700 | 1.535 | 56.197 |
| S4 | ASPH. | 2.305 | 2.592 | | |
| S5 | STD. | Infinity | 1.897 | 1.847 | 23.791 |
| S6 | STD. | −5.117 | 0.624 | | |
| STO | STD. | Infinity | 0.929 | | |
| S8 | STD. | 12.900 | 1.976 | 1.883 | 40.807 |
| S9 | STD. | −2.200 | 0.400 | 1.923 | 20.882 |
| S10 | STD. | Infinity | 0.155 | | |
| S11 | ASPH. | 15.366 | 1.492 | 1.535 | 56.197 |
| S12 | ASPH. | −2.786 | 2.829 | | |
| S13 | STD. | Infinity | 0.400 | 1.516 | 64.115 |
| S14 | STD. | Infinity | 0.066 | | |
| IMA | STD. | Infinity | | | |

Unlike example 1 and 2, some surfaces in example 4 are aspherical, marked with "ASPH" label in the above table.

TABLE 4B

Aspheric coefficients for Example 4.

| | |
|---|---|
| Surface S3 | |
| Coeff r2 | 0.0000E+00 |
| Coeff r4 | 4.8044E−03 |
| Coeff r6 | −2.3557E−04 |
| Coeff r8 | −1.0578E−05 |
| Coeff r10 | 6.7819E−07 |
| Coeff r12 | 0.0000E+00 |
| Coeff r14 | 0.0000E+00 |
| Coeff r16 | 0.0000E+00 |
| Surface S4 | |
| Coeff r2 | 0.0000E+00 |
| Coeff r4 | 4.0596E−03 |
| Coeff r6 | 2.6348E−03 |
| Coeff r8 | −2.7771E−04 |
| Coeff r10 | 0.0000E+00 |
| Coeff r12 | 0.0000E+00 |
| Coeff r14 | 0.0000E+00 |
| Coeff r16 | 0.0000E+00 |
| Surface S11 | |
| Coeff r2 | 0.0000E+00 |
| Coeff r4 | −1.5301E−02 |
| Coeff r6 | 2.5565E−03 |
| Coeff r8 | 0.0000E+00 |
| Coeff r10 | 0.0000E+00 |
| Coeff r12 | 0.0000E+00 |
| Coeff r14 | 0.0000E+00 |
| Coeff r16 | 0.0000E+00 |
| Surface S12 | |
| Coeff r2 | 0.0000E+00 |
| Coeff r4 | 4.1738E−03 |
| Coeff r6 | −7.6123E−04 |
| Coeff r8 | 4.7045E−04 |
| Coeff r10 | 0.0000E+00 |
| Coeff r12 | 0.0000E+00 |

TABLE 4B-continued

Aspheric coefficients for Example 4.

| Coeff r14 | 0.0000E+00 |
|---|---|
| Coeff r16 | 0.0000E+00 |

Example 4 satisfies the conditional equations (1)-(5).

Example 5

Figure 5:
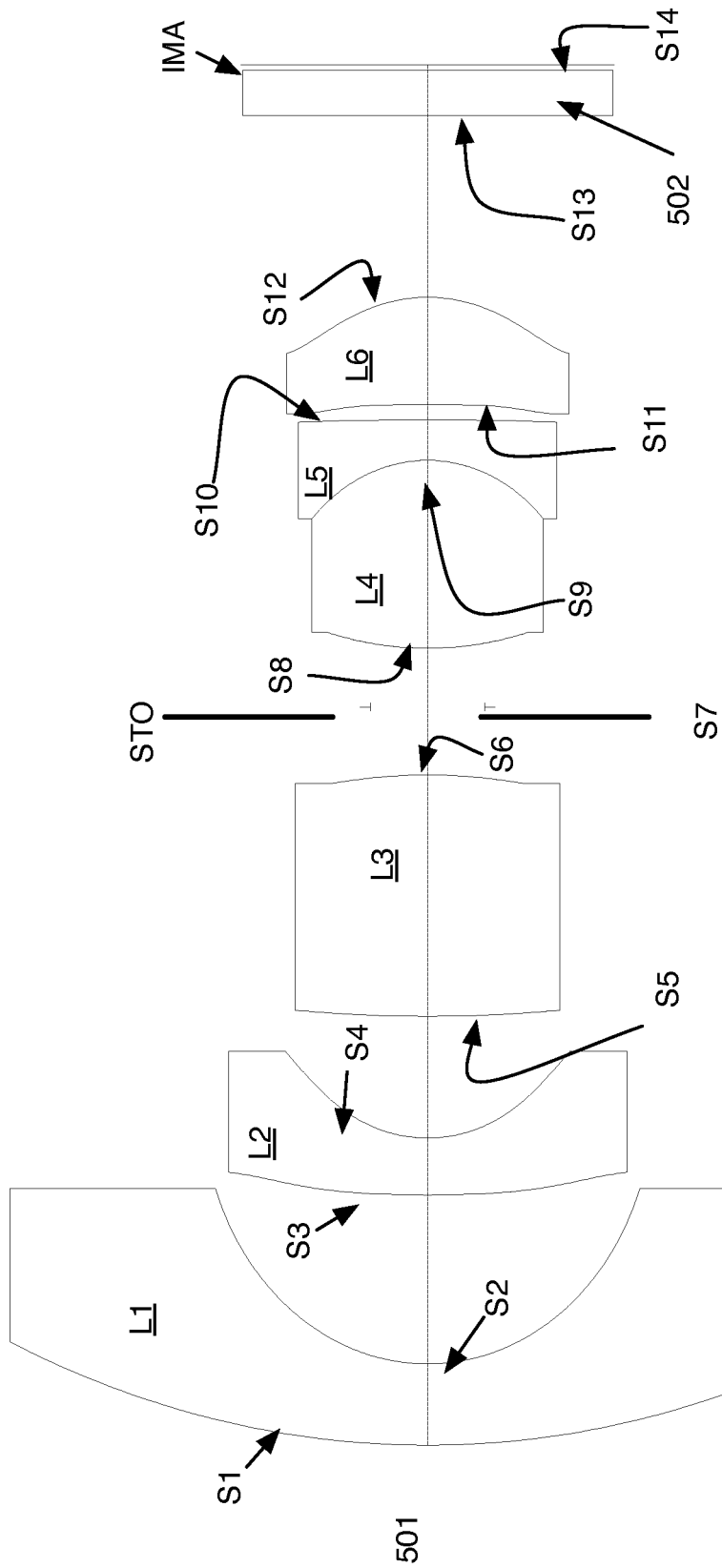
FIG. 5 is a diagram of a fifth embodiment.

FIG. 5 shows the optical layout of Example 5. Counting from the left side 501, which is also the object side, the first element L1 is a meniscus lens with negative power. The object surface S1 is convex and the image surface S2 is concave. The second element L2 has negative power having an aspheric concave image surface S4. The object surface S3 is a convex aspheric surface. The third element L3 has a positive power having a double convex shape. The surfaces S5, S6 of the third element L3 are both convex. The aperture stop STO, S7 follows the $3^{rd}$ element. The fourth element L4 and fifth elements L5 form a cemented doublet where the power of the fourth element is positive and fifth negative. The image surface S10 of the fifth element is convex. The object surface S8 of the fourth element is convex and the shared surface S9 of the cemented doublet has a negative radius. The sixth element L6 has a positive power. The object surface S11 is a concave aspheric surface and the image surface S12 is a convex aspheric surface. The last flat element in front of the image plane 502 the right most surface is the cover glass of the sensor IMA. The first group comprises L1-L2 having negative power. The second group comprises L3 having positive power. The third group comprises L4-L6 having positive power. Surfaces in group G1, G2 and G3 are chosen such as the ghost images formed between them and the two surfaces S13, S14 of the sensor cover glass are out of the focus on the image plane. The intensity ratio of the ghost images to the primary image is less than $10^{-5}$. Tables 5A and 5B shows the detailed prescription of this example. The tables follow the conventions used by Zemax optical design software. This design is capable of imaging over a field of view (FOV) at least 180 degrees with f/#=2.2 relative aperture. The example prescription shown in the following table has an effective focal length of 1.38 mm. This prescription is scalable to a different focal length while maintaining the same FOV and F/# values.

TABLE 5a

Optical Prescription of Example 5

| Surf | Type | Radius | Thickness | Index | Abbe |
|---|---|---|---|---|---|
| OBJ | STD. | Infinity | Infinity | | |
| S1 | STD. | 14.913 | 1.000 | 1.729 | 54.669 |
| S2 | STD. | 3.252 | 2.082 | | |
| S3 | ASPH. | 30.000 | 0.700 | 1.535 | 56.197 |
| S4 | ASPH. | 2.348 | 1.499 | | |
| S5 | STD. | 25.000 | 2.970 | 1.923 | 20.882 |
| S6 | STD. | −9.293 | 0.836 | | |
| STO | STD. | Infinity | 0.725 | | |
| S8 | STD. | 5.456 | 2.314 | 1.883 | 40.807 |
| S9 | STD. | −2.300 | 0.500 | 1.923 | 20.882 |
| S10 | STD. | −59.562 | 0.186 | | |
| S11 | ASPH. | Infinity | 1.320 | 1.535 | 56.197 |
| S12 | ASPH. | −2.572 | 2.242 | | |
| S13 | STD. | Infinity | 0.550 | 1.516 | 64.115 |
| S14 | STD. | Infinity | 0.075 | | |
| IMA | STD. | Infinity | | | |

Some surfaces in example 5 are aspherical, marked with "ASPH" label in the above table.

TABLE 5B

Aspheric coefficients for Example 5.

| SURFACE S3 | |
|---|---|
| Coeff r2 | 0.0000E+00 |
| Coeff r4 | 6.5098E−03 |
| Coeff r6 | −3.4732E−04 |
| Coeff r8 | −4.8067E−05 |
| Coeff r10 | 2.9498E−06 |
| Coeff r12 | 0.0000E+00 |
| Coeff r14 | 0.0000E+00 |
| Coeff r16 | 0.0000E+00 |
| SURFACE S4 | |
| on r2 | 0.0000E+00 |
| Coeff r4 | 1.5674E−03 |
| Coeff r6 | 2.6953E−03 |
| Coeff r8 | −1.1724E−03 |
| Coeff r10 | 0.0000E+00 |
| Coeff r12 | 0.0000E+00 |
| Coeff r14 | 0.0000E+00 |
| Coeff r16 | 0.0000E+00 |
| SURFACE S11 | |
| Coeff r2 | 0.0000E+00 |
| Coeff r4 | −2.6439E−02 |
| Coeff r6 | 4.8247E−03 |
| Coeff r8 | 0.0000E+00 |
| Coeff r10 | 0.0000E+00 |
| Coeff r12 | 0.0000E+00 |
| Coeff r14 | 0.0000E+00 |
| Coeff r16 | 0.0000E+00 |
| SURFACE S12 | |
| Coeff r2 | 0.0000E+00 |
| Coeff r4 | 3.6362E−03 |
| Coeff r6 | 1.9682E−04 |
| Coeff r8 | 7.9842E−04 |
| Coeff r10 | 0.0000E+00 |
| Coeff r12 | 0.0000E+00 |
| Coeff r14 | 0.0000E+00 |
| Coeff r16 | 0.0000E+00 |

Examples 6-8

Represent more compact designs where condition 5 is narrowed to 8=<TTL/EFL<=10. All examples are six element designs having 2 lens elements in the first group, 1 lens element in the second group and three lens elements in the third group. An aperture stop is located between the second and third group. All of the examples shown also meet the parameters of:

1) The Abbe numbers of the lens element of the second group L3 is less than 24 and the Abbe numbers of the middle lens element in the $3^{rd}$ group L5 is less than 21.
2) The refractive index (at d-line) of the lens element in the second group L3 and the refractive index of the middle lens element in the $3^{rd}$ group L5 are both greater than 1.8.
3) The ratio of TTL to the effective focal length satisfies condition 8=<TTL/EFL<=10.

The field of view of all embodiments is 145 degrees or greater and the f# of the lenses as described is 2.8.

In the preferred embodiment, the refractive index of the middle element of the $3^{rd}$ group is greater than 1.9 and the Abbe number of the middle element L5 of the third group is greater than 21.

Prescriptions for specific designs that include the placement of the lens elements, the shape of the lens element surfaces and the index of refraction and abbe numbers for the lens elements are reported with the examples below. The prescriptions are scaled to a unitary effective focal length of 1 mm. It is well known in art that it is possible to scale a known design based on the exact image size requirement. The invention claimed should include all scaled versions of the examples provided.

Example 6

Figure 6:
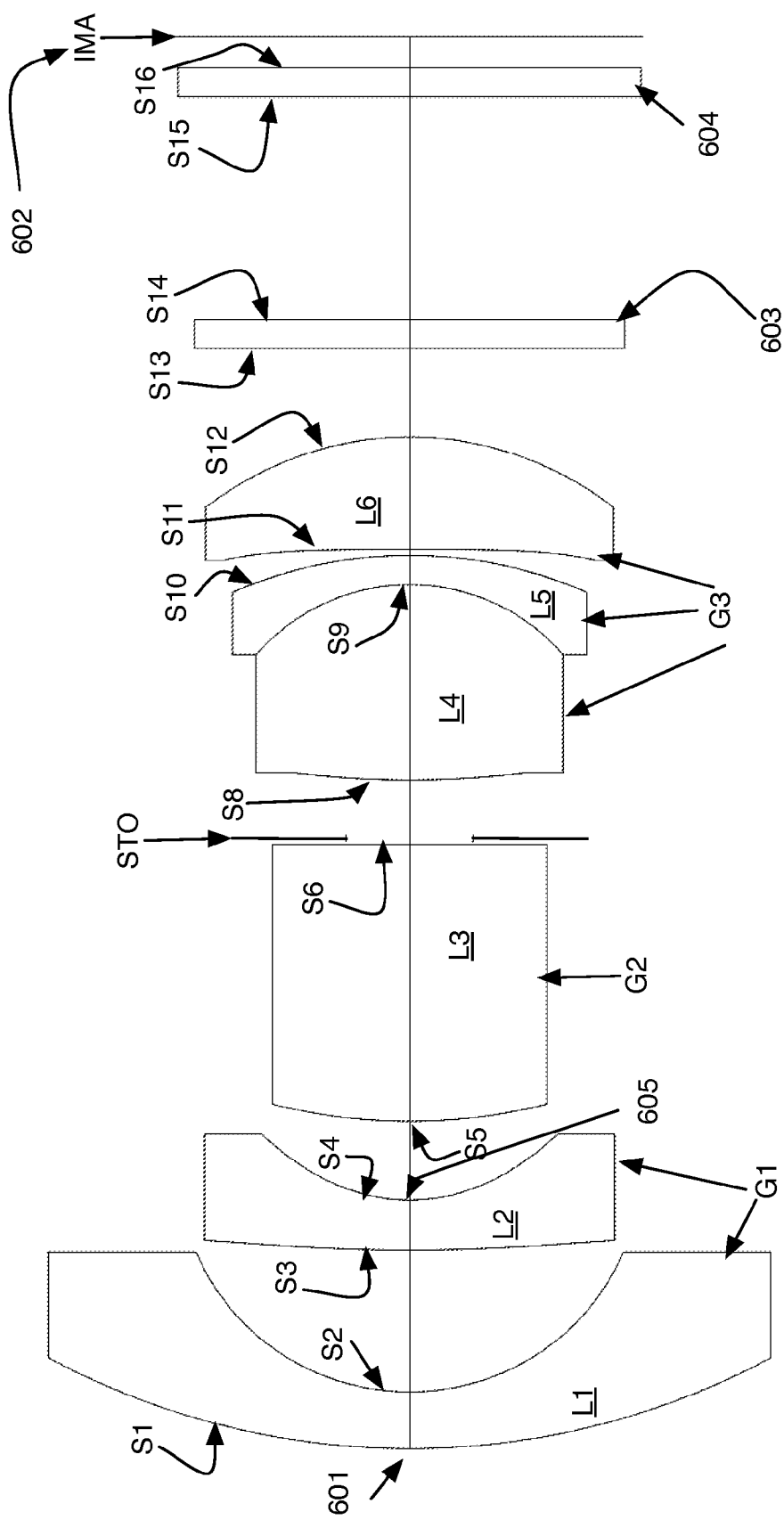
FIG. 6 is a diagram of a sixth embodiment.

FIG. 6 shows the optical layout of Example 6. Counting from the left side 601, which is also the object side, the first element L1 is a meniscus lens with negative power. The second element L2 has negative power having a concave image surface S4 and a convex aspheric object surface S3 with a radius of 11.01 at the vertex 605. The third element L3 has a positive power, made from a low Abbe number material. The aperture stop STO follows the $3^{rd}$ element. The fourth element L4 and fifth elements L5 form a cemented doublet where the power of the fourth element L4 is positive and fifth L5 negative. The image surface S10 of the fifth element is convex. The sixth element L6 has a positive power. The object side surface of the sixth element S11 is a concave aspheric surface with a flat vertex (radius at vertex is infinity). The next flat element 603 represents an optical filter such as an IR cut-off or optical low-pass filter. The last flat element 604 in front of the image plane (the right most surface) is the cover glass of the sensor IMA, 602. The first group G1 comprises L1-L2 having negative power. The second group G2 comprises L3 having positive power. The third group G3 comprises L4-L6 having positive power. All optical surfaces (especially the surfaces in the G3) are chosen such as the ghost images formed between/among them and the two surfaces of the sensor cover glass are out of the focus on the image plane.

Table 6 shows the detailed prescription of this example. This table follows the conventions used by Zemax optical design software. This design is capable of imaging over a field of view >=145 degrees with f/#=2.9. All distance dimensions, including the radius of curvature and the thickness data, reported here and in subsequent tables, are unitless scaled to an effective focal length of 1.00. In a preferred embodiment, the total track length of the design is between 22 mm and 26 mm by properly scaling the design.

TABLE 6a

Optical Prescription of Example 6

| Surface | Type | Radius | Thickness | Index | Abbe |
|---|---|---|---|---|---|
| OBJ | STANDARD | Infinity | Infinity | | |
| S1 | STANDARD | 4.57 | 0.354 | 1.7292 | 54.67 |
| S2 | STANDARD | 1.41 | 0.885 | | |
| S3 | EVENASPH | 11.01 | 0.312 | 1.5346 | 56.20 |
| S4 | EVENASPH | 1.06 | 0.491 | | |
| S5 | STANDARD | 3.36 | 1.729 | 1.9229 | 20.88 |
| S6 | STANDARD | Infinity | 0.037 | | |
| STO | STANDARD | Infinity | 0.363 | | |
| S8 | STANDARD | 5.71 | 1.217 | 1.7292 | 54.67 |
| S9 | STANDARD | -1.22 | 0.183 | 1.9229 | 20.88 |
| S10 | STANDARD | -2.64 | 0.037 | | |
| S11 | EVENASPH | Infinity | 0.702 | 1.5346 | 56.20 |
| S12 | EVENASPH | -1.93 | 0.551 | | |
| S13 | STANDARD | Infinity | 0.184 | 1.5168 | 64.21 |
| S14 | STANDARD | Infinity | 1.386 | | |
| S15 | STANDARD | Infinity | 0.184 | 1.5164 | 64.12 |
| S16 | STANDARD | Infinity | 0.195 | | |
| IMA | STANDARD | Infinity | | | |

Surfaces marked with "EVENASPH" label in the above table are aspheric.

TABLE 6b

Aspheric coefficients for Example 6.

| Surface 3 S3 | Coeff r2 | 0.000E+00 |
|---|---|---|
| | Coeff r4 | -2.6213E-03 |
| | Coeff r6 | 3.3911E-03 |
| | Coeff r8 | -6.9183E-03 |
| | Coeff r10 | 2.3388E-03 |
| | Coeff r12 | 0.000E+00 |
| | Coeff r14 | 0.000E+00 |
| | Coeff r16 | 0.000E+00 |
| Surface 4 S4 | Coeff r2 | 0.000E+00 |
| | Coeff r4 | -4.8284E-02 |
| | Coeff r6 | -8.7859E-02 |
| | Coeff r8 | 5.1610E-02 |
| | Coeff r10 | -9.9487E-02 |
| | Coeff r12 | 0.000E+00 |
| | Coeff r14 | 0.000E+00 |
| | Coeff r16 | 0.000E+00 |
| Surface 11 S11 | Coeff r2 | 0.000E+00 |
| | Coeff r4 | -3.7973E-02 |
| | Coeff r6 | -2.6593E-03 |
| | Coeff r8 | 0.000E+00 |
| | Coeff r10 | 0.000E+00 |
| | Coeff r12 | 0.000E+00 |
| | Coeff r14 | 0.000E+00 |
| | Coeff r16 | 0.000E+00 |
| Surface 12 S12 | Coeff r2 | 0.000E+00 |
| | Coeff r4 | 6.5694E-03 |
| | Coeff r6 | -9.0537E-04 |
| | Coeff r8 | 4.1384E-04 |
| | Coeff r10 | 0.000E+00 |
| | Coeff r12 | 0.000E+00 |
| | Coeff r14 | 0.000E+00 |
| | Coeff r16 | 0.000E+00 |

Example 7

Figure 7:
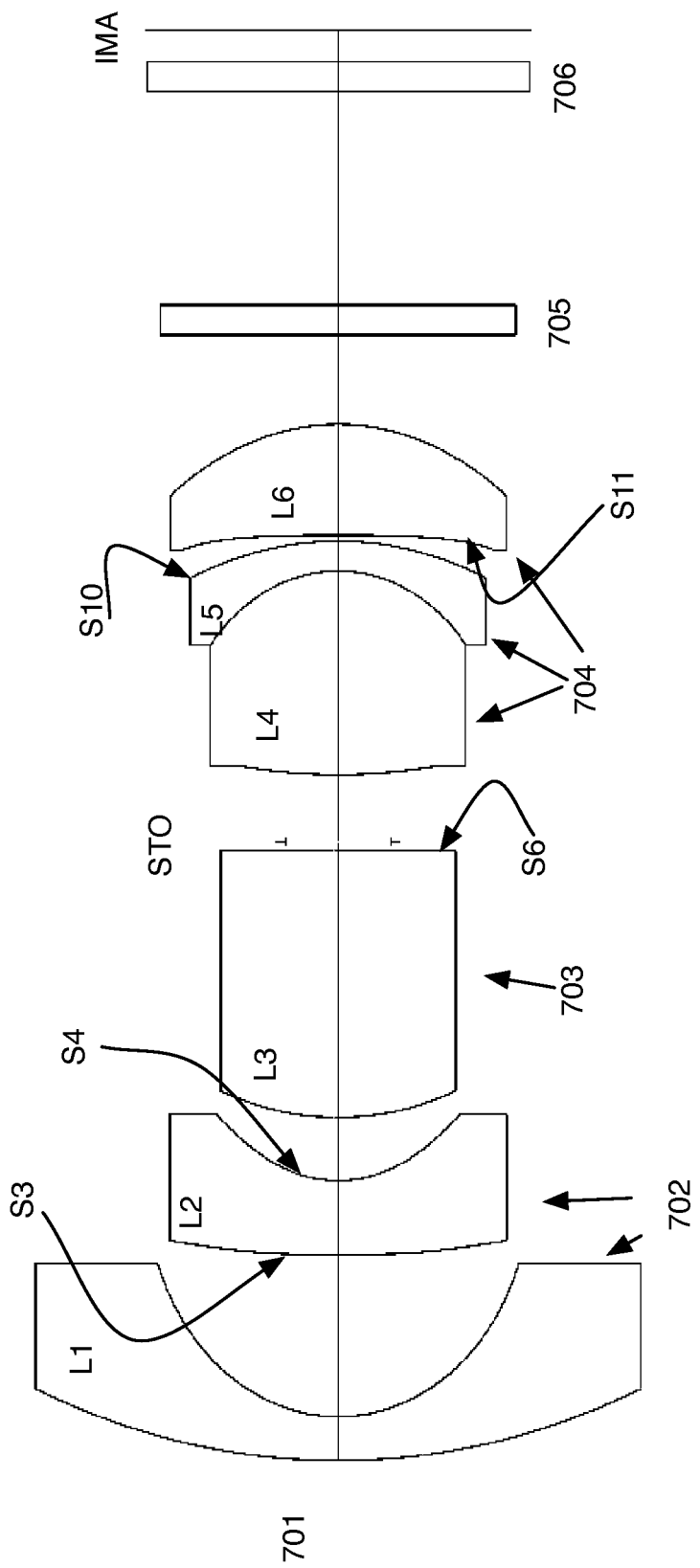
FIG. 7 is a diagram of a seventh embodiment.

FIG. 7 shows the optical layout of Example 7. Counting from the left side, which is also the object side 701, the first element L1 is a meniscus lens with negative power. The second element L2 has negative power having a concave image surface and a convex aspheric object surface S3 with a radius of 18.4 at the vertex (center of radius of curvature is on the image side). The first and second elements form the first group G1 702. The third element L3 forming the second group G2 703 has a positive power and is made from a material having an Abbe number of 23.79. The aperture stop STO follows the $3^{rd}$ element. The fourth, fifth and sixth elements form the third group G3 704. The fourth element L4 and fifth elements L5 form a cemented doublet where the power of the fourth element is positive and fifth negative. The image surface S10 of the fifth element is convex. The sixth element L6 has a positive power. The object surface S11 of the sixth element is a concave aspheric surface having a concave vertex radius of 100 (center of the radius of curvature is on the object side). The next flat element 705 represents an optical filter such as an IR cut-off or optical low-pass filter. The last flat element 706 in front of the image plane (the right most surface) is the cover glass of the sensor IMA. The first group 702 comprises two elements L1, L2 having negative power. The second group 703 comprises L3 having positive power. The third group 704 comprises three elements L4-L6 having positive power. All optical surfaces are chosen such as the ghost images formed between/among them and the two surfaces of the sensor cover glass are out of the focus on the image plane.

Table 7a shows the detailed prescription of this example. This design is capable of imaging over a field of view >=145 with f/#=2.8. The numbers reported are unitless scaled to an effective focal length of 1. In a preferred embodiment, the total track length of the design is between 22 and 26 mm by properly scaling the design.

TABLE 7a

Optical Prescription of Example 7

| Surface | Type | Radius | Thickness | Index | Abbe |
|---|---|---|---|---|---|
| OBJ | STANDARD | | | | |
| S1 | STANDARD | 5.94 | 0.271 | 1.73 | 54.7 |
| S2 | STANDARD | 1.43 | 1.001 | | |
| S3 | EVENASPH | 18.40 | 0.457 | 1.53 | 56.2 |
| S4 | EVENASPH | 1.09 | 0.390 | | |
| S5 | STANDARD | 2.41 | 1.645 | 1.85 | 23.8 |
| S6 | STANDARD | −177.02 | 0.056 | | |
| STO S7 | STANDARD | Infinity | 0.416 | | |
| S8 | STANDARD | 5.24 | 1.256 | 1.73 | 54.7 |
| S9 | STANDARD | −1.22 | 0.184 | 1.92 | 20.9 |
| S10 | STANDARD | −2.78 | 0.037 | | |
| S11 | EVENASPH | −36.80 | 0.685 | 1.53 | 56.2 |
| S12 | EVENASPH | −1.91 | 0.552 | | |
| S13 | STANDARD | Infinity | 0.184 | 1.52 | 64.2 |
| S14 | STANDARD | Infinity | 1.320 | | |
| S15 | STANDARD | Infinity | 0.184 | 1.52 | 64.1 |
| S16 | STANDARD | Infinity | 0.195 | | |
| IMA | STANDARD | | | | |

Surfaces marked with "EVENASPH" label in the above table are aspheric.

TABLE 7b

Aspheric coefficients for Example 7

| Surface 3 | Coeff r2 | 0.000E+00 |
| | Coeff r4 | 4.3957E−02 |
| | Coeff r6 | −2.0286E−02 |
| | Coeff r8 | 3.5175E−04 |
| | Coeff r10 | 1.2608E−03 |
| | Coeff r12 | 0.000E+00 |
| | Coeff r14 | 0.000E+00 |
| | Coeff r16 | 0.000E+00 |
| Surface 4: | Coeff r2 | 0.000E+00 |
| | Coeff r4 | −2.1935E−02 |
| | Coeff r6 | −2.2624E−02 |
| | Coeff r8 | −1.0886E−01 |
| | Coeff r10 | 0.000E+00 |
| | Coeff r12 | 0.000E+00 |
| | Coeff r14 | 0.000E+00 |
| | Coeff r16 | 0.000E+00 |
| Surface 11: | Coeff r2 | 0.000E+00 |
| | Coeff r4 | −3.2137E−02 |
| | Coeff r6 | −5.2389E−03 |
| | Coeff r8 | 0.000E+00 |
| | Coeff r10 | 0.000E+00 |
| | Coeff r12 | 0.000E+00 |
| | Coeff r14 | 0.000E+00 |
| | Coeff r16 | 0.000E+00 |
| Surface 12: | Coeff r2 | 0.000E+00 |
| | Coeff r4 | 1.3074E−02 |
| | Coeff r6 | −1.8832E−03 |
| | Coeff r8 | 3.5945E−04 |
| | Coeff r10 | 0.000E+00 |
| | Coeff r12 | 0.000E+00 |
| | Coeff r14 | 0.000E+00 |
| | Coeff r16 | 0.000E+00 |

Example 8

Figure 8:
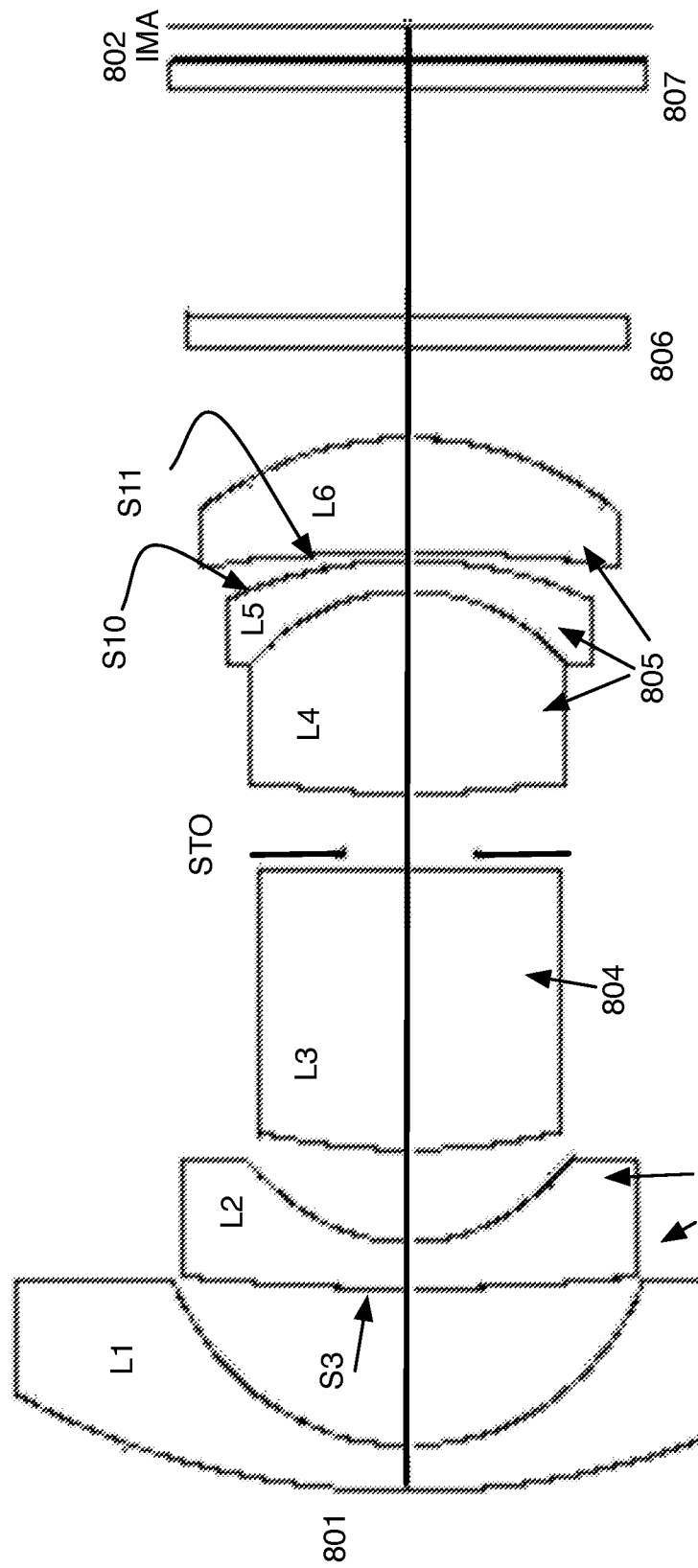
FIG. 8 is a diagram of a eighth embodiment.

FIG. 8 shows the optical layout of Example 8. Counting from the left side, which is also the object side 801, the first element L1 is a meniscus lens with negative power. The second element L2 has negative power having a concave image surface and a convex aspheric object surface S3 with a radius of 8.05 at the vertex. The third element L3 has a positive power and is made from a low Abbe number material. The aperture stop STO follows the $3^{rd}$ element. The fourth element L4 and fifth elements L5 form a cemented doublet where the power of the fourth element is positive and fifth negative. The image surface S10 of the fifth element is convex. The sixth element L6 has a positive power. The object surface S11 of the sixth element is a concave aspheric surface with a flat vertex (radius at vertex is infinity). The next flat element 806 represents an optical filter such as an IR cut-off or optical low-pass filter. The last flat element 807 in front of the image plane (the right most surface) is the cover glass of the sensor IMA. The first group 803 comprises two elements L1, L2 having negative power. The second group 804 comprises L3 having positive power. The third group 805 comprises three elements L4-L6 having positive power. All optical surfaces are chosen such as the ghost images formed between/among them and the two surfaces of the sensor cover glass are out of the focus on the image plane 802.

Table 8a shows the detailed prescription of this example. This design is capable of imaging over a field of view >=145 with f/#=2.8. The numbers reported are unitless scaled to an effective focal length of 1. In a preferred embodiment, the total track length of the design is between 22 and 26 mm by properly scaling the design.

TABLE 8a

Optical Prescription of Example 8

| Surf | Type | Radius | Thickness | Index | Abbe |
|---|---|---|---|---|---|
| Object | | | | | |
| S1 | STANDARD | 4.62 | 0.43 | 1.73 | 54.7 |
| S2 | STANDARD | 1.37 | 0.90 | | |
| S3 | EVENASPH | 8.05 | 0.27 | 1.53 | 56.2 |
| S4 | EVENASPH | 1.04 | 0.50 | | |
| S5 | STANDARD | 3.36 | 1.65 | 1.92 | 20.9 |
| S6 | STANDARD | Infinity | 0.06 | | |
| S7 STO | STANDARD | Infinity | 0.36 | | |
| S8 | STANDARD | 5.69 | 1.21 | 1.73 | 54.7 |
| S9 | STANDARD | −1.22 | 0.18 | 1.92 | 20.9 |
| S10 | STANDARD | −2.63 | 0.04 | | |
| S11 | EVENASPH | Infinity | 0.70 | 1.53 | 56.2 |
| S12 | EVENASPH | −1.93 | 0.55 | | |
| S13 | STANDARD | Infinity | 0.18 | 1.52 | 64.2 |
| S14 | STANDARD | Infinity | 1.37 | | |
| S15 | STANDARD | Infinity | 0.18 | 1.52 | 64.1 |
| S16 | STANDARD | Infinity | 0.19 | | |
| IMA | STANDARD | Infinity | | | |

Surfaces marked with "EVENASPH" label in the above table are aspheric.

TABLE 8b

Aspheric coefficients for Example 8

| Surface 3 S3 | Coeff r2 | 0.000E+00 |
| | Coeff r4 | −2.8447E−02 |
| | Coeff r6 | 2.7459E−02 |
| | Coeff r8 | −2.0662E−02 |
| | Coeff r10 | 5.6636E−03 |
| | Coeff r12 | 0.000E+00 |
| | Coeff r14 | 0.000E+00 |
| | Coeff r16 | 0.000E+00 |
| Surface 4 S4 | Coeff r2 | 0.000E+00 |
| | Coeff r4 | −8.2438E−02 |
| | Coeff r6 | −8.4727E−02 |
| | Coeff r8 | 7.0590E−02 |
| | Coeff r10 | −1.2894E−01 |
| | Coeff r12 | 0.000E+00 |
| | Coeff r14 | 0.000E+00 |
| | Coeff r16 | 0.000E+00 |

TABLE 8b-continued

Aspheric coefficients for Example 8

| | | |
|---|---|---|
| Surface 11 S11 | Coeff r2 | 0.000E+00 |
| | Coeff r4 | −3.8285E−02 |
| | Coeff r6 | −2.6958E−03 |
| | Coeff r8 | 0.000E+00 |
| | Coeff r10 | 0.000E+00 |
| | Coeff r12 | 0.000E+00 |
| | Coeff r14 | 0.000E+00 |
| | Coeff r16 | 0.000E+00 |
| Surface 12 S12 | Coeff r2 | 0.000E+00 |
| | Coeff r4 | 6.6234E−03 |
| | Coeff r6 | −9.1780E−04 |
| | Coeff r8 | 4.2182E−04 |
| | Coeff r10 | 0.000E+00 |
| | Coeff r12 | 0.000E+00 |
| | Coeff r14 | 0.000E+00 |
| | Coeff r16 | 0.000E+00 |

Example 9-13

Examples 9-13 shown in FIGS. 9-13 show wide-angle low ghosting lens designs that include 5, 6 and 7 lens elements. Example 12 is a seven element lens design and Example 13 is a 5 element lens design.

All of the designs meet the conditional expression 7=<TTL/EFL<=20, and V5<24.

Example 9

Figure 9:
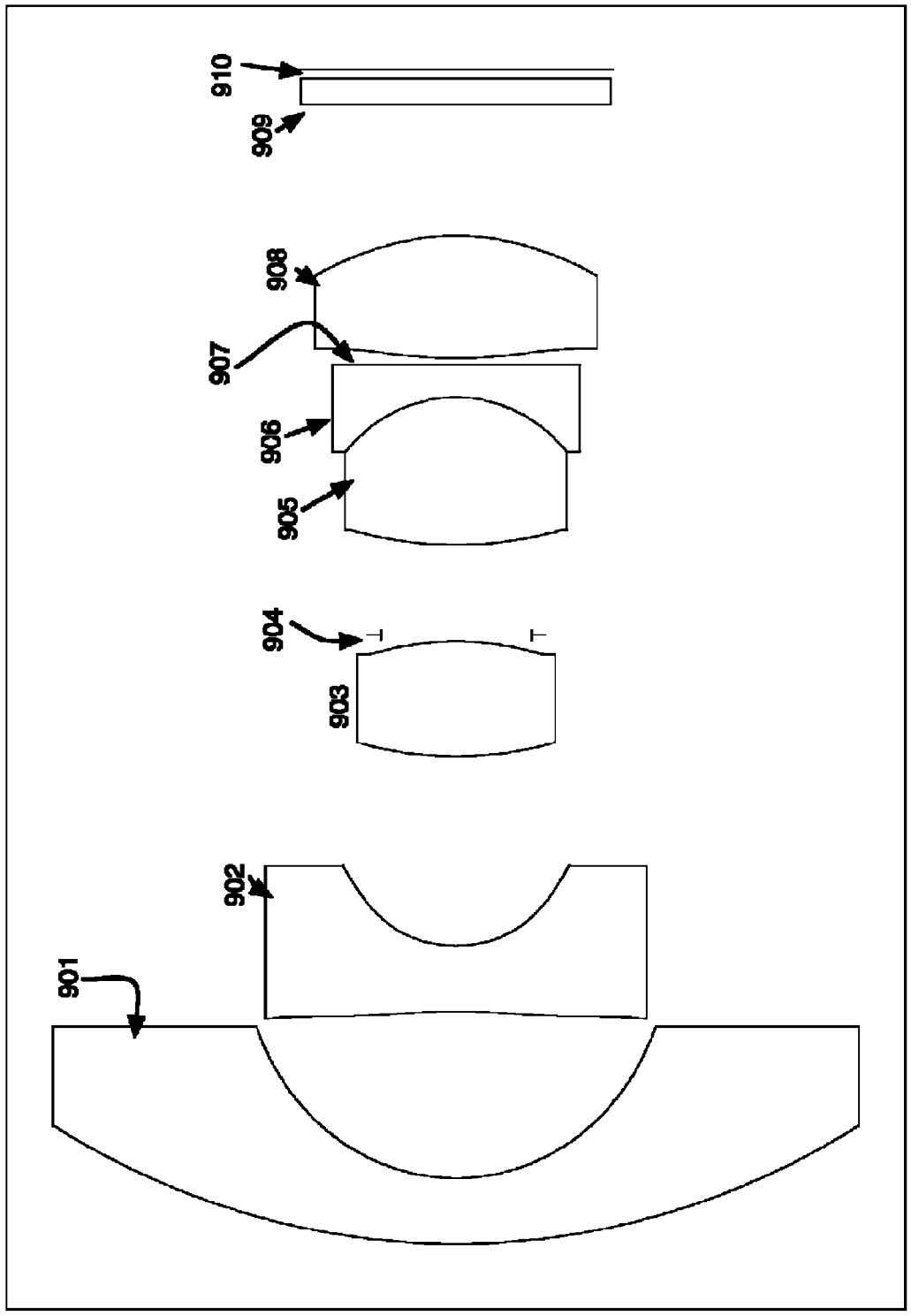
FIG. 9 is a diagram of a ninth embodiment.

FIG. 9 shows the optical layout of Example 9. Counting from the left side, which is also the object side, the first element 901 is a glass meniscus lens with negative power. The second element 902 is an aspheric element preferably made by injection molding of suitable plastic material. The third element 903 is a bi-convex or plano-convex element with positive power. The aperture stop 904 follows the $3^{rd}$ element. The fourth element 905 and fifth elements 906 form a cemented doublet where the power of the fourth element is positive and fifth negative. The right surface or image side surface 907 of the fifth element is flat or convex. The sixth element 908 is an aspheric element with positive power preferably made by injection molding of suitable plastic material. The flat element 909 in front of the image plane 910 (the right most surface) is the cover glass of the sensor located at the image plane.

Tables 9a and 9b show the detailed prescription of this example. This table follows the conventions used by Zemax® optical design software. The recipe as shown has an effective focal length of 1.38 mm and a f/# of 2.3 but the design can be scaled to any focal length.

TABLE 9a

Prescription for Example 9

| Surf | Type | Radius (mm) | Thickness (mm) | Index | Abbe |
|---|---|---|---|---|---|
| Object | | | | | |
| S1 | STANDARD | 13.28 | 1 | 1.72 | 50.35 |
| S2 | STANDARD | 3.52 | 2.54 | | |
| S3 | EVENASPH | −9.89 | 1 | 1.53 | 56.2 |
| S4 | EVENASPH | 2.20 | 2.89 | | |
| S5 | STANDARD | 6.44 | 1.75 | 1.70 | 41.14 |
| S6 | STANDARD | −5.37 | 0.10 | | |
| S7 STO | STANDARD | Infinity | 1.38 | | |
| S8 | STANDARD | 7.05 | 2.25 | 1.73 | 54.7 |
| S9 | STANDARD | −2.44 | 0.50 | 1.92 | 20.9 |

TABLE 9a-continued

Prescription for Example 9

| Surf | Type | Radius (mm) | Thickness (mm) | Index | Abbe |
|---|---|---|---|---|---|
| S10 | STANDARD | Infinity | 0.10 | | |
| S11 | EVENASPH | 7.40 | 1.86 | 1.53 | 56.2 |
| | Conic constant S11 = −48.118 | | | | |
| S12 | EVENASPH | −4.54 | 2.00 | | |
| S13 | STANDARD | Infinity | 0.40 | 1.52 | 64.1 |
| S14 | STANDARD | Infinity | 0.125 | | |

TABLE 9b

Aspheric constants for Example 9

| | | |
|---|---|---|
| Surface 3 S3 | Coeff r2 | 0.000E+00 |
| | Coeff r4 | .01339 |
| | Coeff r6 | −.001621 |
| | Coeff r8 | 8.889E−05 |
| | Coeff r10 | −1.978E−06 |
| | Coeff r12 | 0.000E+00 |
| | Coeff r14 | 0.000E+00 |
| | Coeff r16 | 0.000E+00 |
| Surface 4 S4 | Coeff r2 | 0.000E+00 |
| | Coeff r4 | .01561 |
| | Coeff r6 | 0.004859 |
| | Coeff r8 | −0.001403 |
| | Coeff r10 | 0 |
| | Coeff r12 | 0 |
| | Coeff r14 | 0 |
| | Coeff r16 | 0 |
| Surface 11 S11 | Coeff r2 | 0 |
| | Coeff r4 | 0 |
| | Coeff r6 | −0.0004941 |
| | Coeff r8 | 0 |
| | Coeff r10 | 0 |
| | Coeff r12 | 0 |
| | Coeff r14 | 0 |
| | Coeff r16 | 0 |
| Surface 12 S12 | Coeff r2 | 0 |
| | Coeff r4 | −0.001826 |
| | Coeff r6 | 0.001318 |
| | Coeff r8 | −0.0001370 |
| | Coeff r10 | 0 |
| | Coeff r12 | 0 |
| | Coeff r14 | 0 |
| | Coeff r16 | 0 |

Example 10

Figure 10:
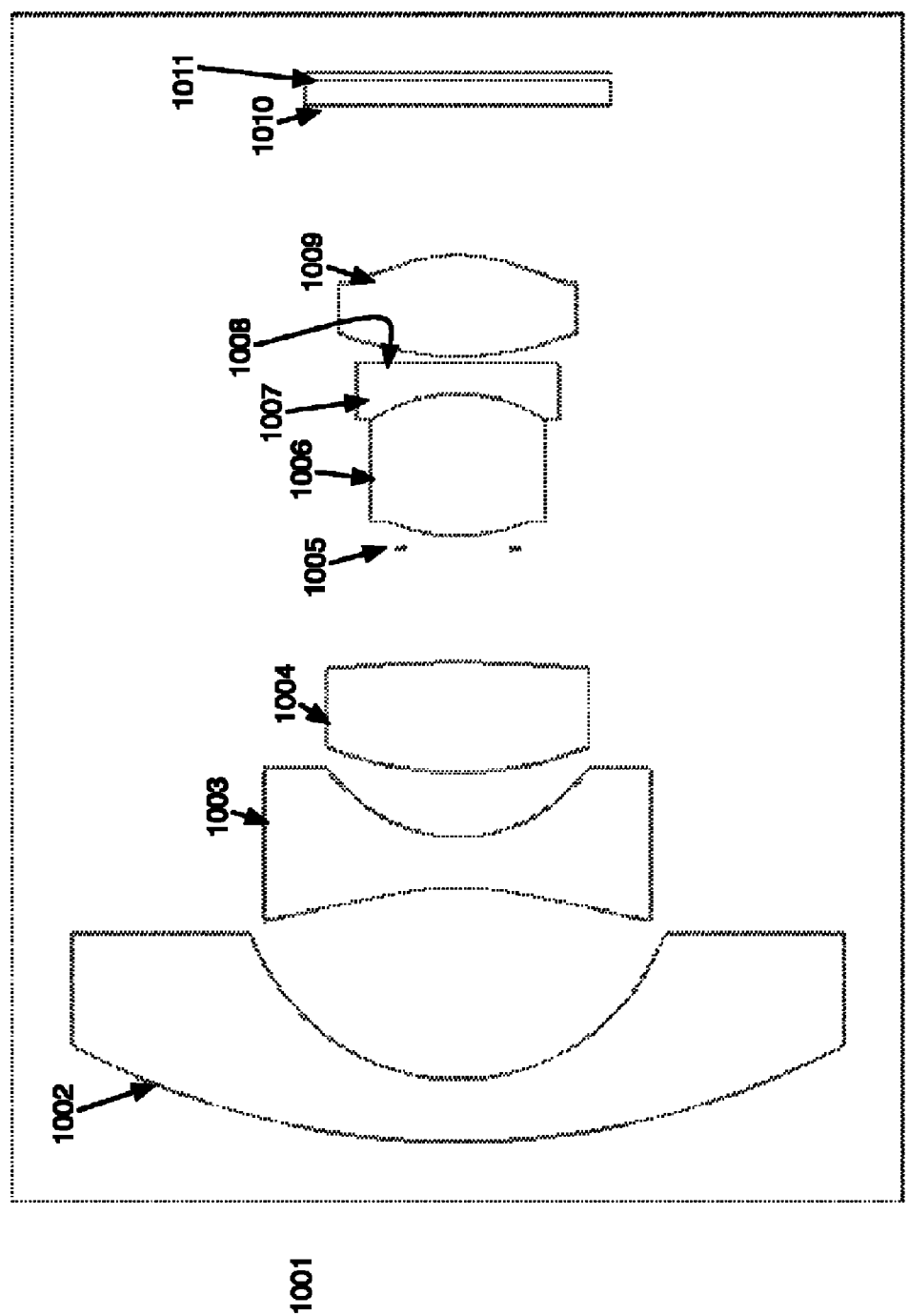
FIG. 10 is a diagram of a tenth embodiment.

FIG. 10 shows the example 10 of the present invention. Counting from the left side, which is also the object side 1001, the first element 1002 is a glass meniscus lens with negative power. The second element 1003 is an aspheric element preferably made by injection molding of suitable plastic material. The third element 1004 is a bi-convex or plano-convex element with positive power. The aperture stop 1005 follows the $3^{rd}$ element. The fourth element 1006 and fifth elements 1007 form a cemented doublet where the power of the fourth element 1006 is positive and fifth negative 1007. The right surface 1008 of the fifth element is flat or convex. The sixth element 1009 is an aspheric element with positive power preferably made by injection molding of suitable plastic material. The flat element 1010 in front of the image plane 1011 (the right most surface) is the cover glass of the sensor. Tables 10a and 10b shows the detailed prescription of this example. This table follows the conventions used by Zemax optical design software. The prescription is given in units of mm and the effective focal length as shown is 1.3 and the f/# is 2.3. The design can however be scaled to any effective focal length.

TABLE 10a

Prescription for Example 10

| Surf | Type | Radius (mm) | Thickness (mm) | Index | Abbe |
|---|---|---|---|---|---|
| Object | | | | | |
| S1 | STANDARD | 12.91 | 1 | 1.77 | 49.61 |
| S2 | STANDARD | 3.496 | 3.050 | | |
| S3 | EVENASPH | −4.086 | 0.80 | 1.53 | 56.2 |
| S4 | EVENASPH | 2.51 | 1.024 | | |
| S5 | STANDARD | 5.457 | 1.75 | 1.847 | 23.79 |
| S6 | STANDARD | −16.95 | 1.811 | | |
| S7 STO | STANDARD | Infinity | 0.206 | | |
| S8 | STANDARD | 2.872 | 2.25 | 1.517 | 64.21 |
| S9 | STANDARD | −2.50 | 0.50 | 1.847 | 23.791 |
| S10 | STANDARD | Infinity | 0.10 | | |
| S11 | EVENASPH | 4.041 | 1.607 | 1.53 | 56.2 |
| | Conic constant for S11 = −12.906 | | | | |
| S12 | EVENASPH | −2.684 | 2.376 | | |
| S13 | STANDARD | Infinity | 0.40 | 1.52 | 64.1 |
| S14 | STANDARD | Infinity | 0.125 | | |

TABLE 10b

Aspheric constants for Example 10

| | | |
|---|---|---|
| Surface 3 S3 | Coeff r2 | 0 |
| | Coeff r4 | 0.0209 |
| | Coeff r6 | −0.00275 |
| | Coeff r8 | 0.000266 |
| | Coeff r10 | −1.387E−05 |
| | Coeff r12 | 3.110E−07 |
| | Coeff r14 | 0 |
| | Coeff r16 | 0 |
| Surface 4 S4 | Coeff r2 | 0 |
| | Coeff r4 | 0.00885 |
| | Coeff r6 | −0.00120 |
| | Coeff r8 | −0.000293 |
| | Coeff r10 | 0 |
| | Coeff r12 | 0 |
| | Coeff r14 | 0 |
| | Coeff r16 | 0 |
| Surface 11 S11 | Coeff r2 | 0 |
| | Coeff r4 | 0 |
| | Coeff r6 | 0.001715 |
| | Coeff r8 | 0 |
| | Coeff r10 | 0 |
| | Coeff r12 | 0 |
| | Coeff r14 | 0 |
| | Coeff r16 | 0 |
| Surface 12 S12 | Coeff r2 | 0 |
| | Coeff r4 | 0.01185 |
| | Coeff r6 | 0.0004205 |
| | Coeff r8 | 0.0008997 |
| | Coeff r10 | 0 |
| | Coeff r12 | 0 |
| | Coeff r14 | 0 |
| | Coeff r16 | 0 |

Example 11

Figure 11:
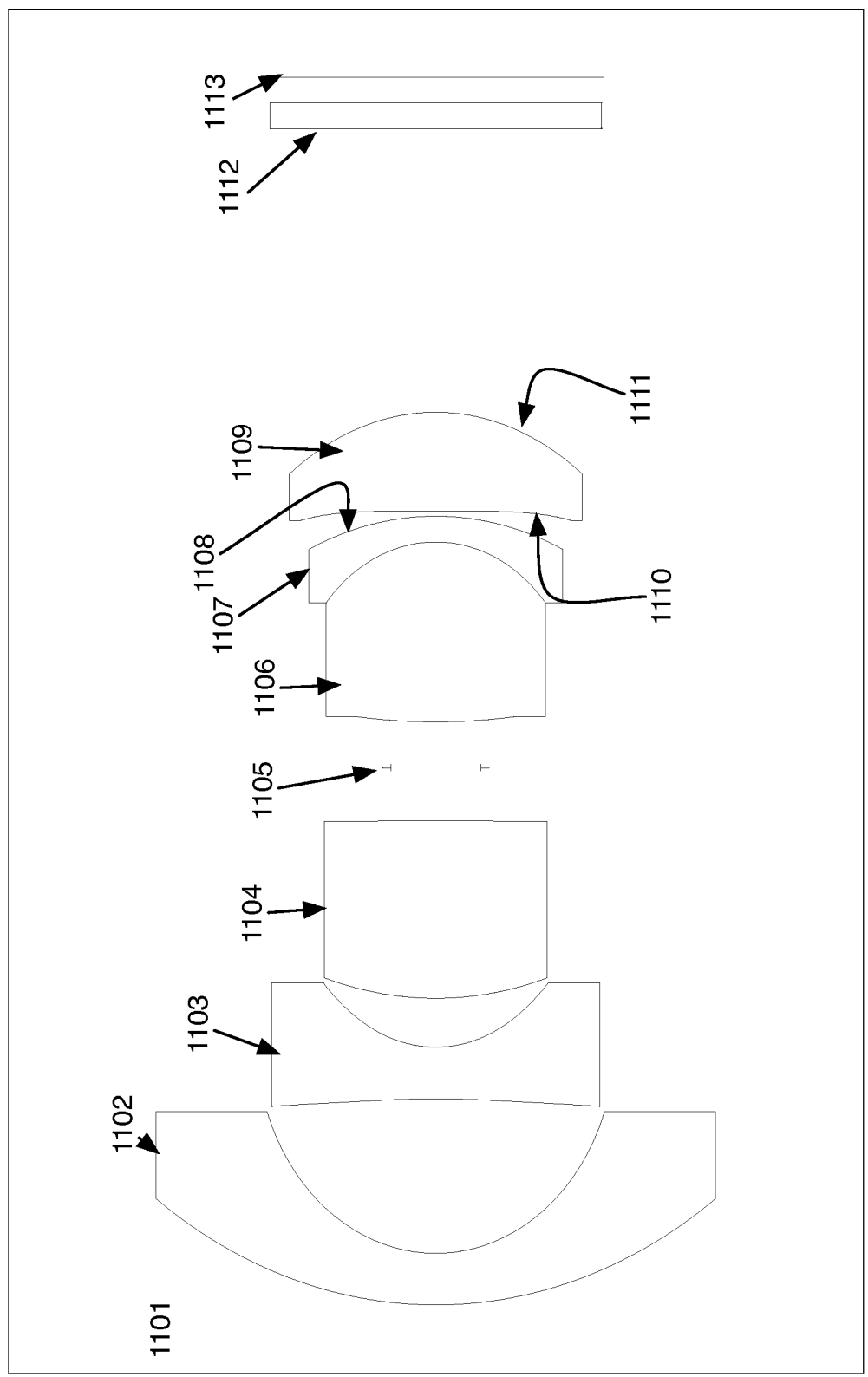
FIG. 11 is a diagram of an eleventh embodiment.

FIG. 11 shows the example 11 of the present invention. Counting from the left side 1101, which is also the object side, the first element 1102 is a glass meniscus lens with negative power. The second element 1103 is an aspheric element preferably made by injection molding of suitable plastic material. The third element 1104 is a bi-convex or plano-convex element with positive power. The aperture stop 1105 follows the $3^{rd}$ element. The fourth element 1106 and fifth elements 1107 form a cemented doublet where the power of the fourth element is positive and fifth negative. The right surface 1108 of the fifth element is convex. The sixth element 1109 is an aspheric element with positive power preferably made by injection molding of suitable plastic material. The left surface or object side surface 1110 of the sixth element is either flat or concave (curving away from the image plane 1113 which is represented by the right most vertical line). The right surface 1111 of this element is convex also curving away from the image plane The flat element 1112 in front of the image plane 1113 (the right most surface) is the cover glass of the sensor.

Tables 11A and 11B show the detailed prescription of this example. This table follows the conventions used by Zemax optical design software. The prescription as shown is for a lens with an effective focal length of 2.72 mm and f/#2.9. The design can be scaled to any effective focal length.

TABLE 11A

Optical Prescription for Example 11

| Surf | Type | Radius (mm) | Thickness (mm) | Index | Abbe |
|---|---|---|---|---|---|
| Object | | | | | |
| S1 | STANDARD | 11.25 | 1 | 1.73 | 54.67 |
| S2 | STANDARD | 4.161 | 3.000 | | |
| S3 | EVENASPH | −22.981 | 1 | 1.54 | 56.20 |
| S4 | EVENASPH | 3.163 | 0.949 | | |
| S5 | STANDARD | 8.614 | 3.446 | 1.923 | 20.882 |
| S6 | STANDARD | −100.33 | 1.023 | | |
| S7 STO | STANDARD | Infinity | 0.892 | | |
| S8 | STANDARD | 16.438 | 3.491 | 1.729 | 54.67 |
| S9 | STANDARD | −3.333 | 0.50 | 1.923 | 20.882 |
| S10 | STANDARD | −7.066 | 0.100 | | |
| S11 | EVENASPH | Infinity | 1.918 | 1.53 | 56.2 |
| S12 | EVENASPH | −5.212 | 5.5 | | |
| S13 | STANDARD | Infinity | 0.5 | 1.516 | 64.112 |
| S14 | STANDARD | Infinity | 0.5 | | |

TABLE 11b

Aspheric constants for Example 11

| | | |
|---|---|---|
| Surface 3 S3 | Coeff r2 | 0 |
| | Coeff r4 | 0.00212 |
| | Coeff r6 | −0.0001581 |
| | Coeff r8 | 5.724E−06 |
| | Coeff r10 | −7.703E−08 |
| | Coeff r12 | 0 |
| | Coeff r14 | 0 |
| | Coeff r16 | 0 |
| Surface 4 S4 | Coeff r2 | 0 |
| | Coeff r4 | −0.000309 |
| | Coeff r6 | 1.417E−06 |
| | Coeff r8 | −5.268E−05 |
| | Coeff r10 | 0 |
| | Coeff r12 | 0 |
| | Coeff r14 | 0 |
| | Coeff r16 | 0 |
| Surface 11 S11 | Coeff r2 | 0 |
| | Coeff r4 | −0.00164 |
| | Coeff r6 | −2.525E−05 |
| | Coeff r8 | 0 |
| | Coeff r10 | 0 |
| | Coeff r12 | 0 |
| | Coeff r14 | 0 |
| | Coeff r16 | 0 |
| Surface 12 S12 | Coeff r2 | 0 |
| | Coeff r4 | 0.000506 |
| | Coeff r6 | −7.576E−06 |
| | Coeff r8 | 1.783E−07 |
| | Coeff r10 | 0 |
| | Coeff r12 | 0 |
| | Coeff r14 | 0 |
| | Coeff r16 | 0 |

Example 12

FIG. 12 shows the example 12 of the present invention. Example 12 is a seven element design. Counting from the left side 1201, which is also the object side, the first element 1202 is a glass meniscus lens with negative power. The second element 1203 is a bi-concave element with negative power. The third element 1204 is a bi-convex or plano-convex element with positive power. The aperture stop 1205 follows the $3^{rd}$ element. The fourth element 1206 is a meniscus element with positive power where the center of the curvature of both surfaces of this element are to the left of the surfaces. The fifth element 1207 and sixth elements 1208 form a cemented doublet where the power of the fifth element is positive and sixth negative. The right surface 1209 of the sixth element is convex.

The seventh element 1210 is a positive element. The right surface 1211 of this element is convex (curving away from the image plane represented by the right most vertical line). The left surface 1212 of the seventh element follows the following condition:

$$1/R = < 1/(2.2*D)$$

Where R is the radius of curvature of the left surface of the seventh element. It is positive number if the center of the radius of curvature is to the right of the surface (as shown). It is negative if the center of curvature is to the right. D is the distance from the vertex of this surface to the image plane. In the preferable embodiment the following condition should be satisfied:

$$1/R = < 1/(2.4*D).$$

The flat element 1213 in front of the image plane (the right most surface) is the cover glass of the sensor 1214.

The optical prescription for example 12 is shown in Table 12. The example is for a lens with an effective focal length of 7 mm and f/#2.4. The design can be scaled to any effective focal length. All surfaces of Example 12 are spherical.

TABLE 12

Optical Prescription for Example 12

| Surf | Type | Radius (mm) | Thickness (mm) | Index | Abbe |
|---|---|---|---|---|---|
| Object | | | | | |
| S1 | STANDARD | 26.86 | 1.8 | 1.487 | 70.420 |
| S2 | STANDARD | 8.813 | 6.761 | | |
| S3 | STANDARD | −53.965 | 1.4 | 1.618 | 63.417 |
| S4 | STANDARD | 8.745 | 6.559 | | |
| S5 | STANDARD | 20.799 | 3.5 | 1.806 | 33.287 |
| S6 | STANDARD | −54.422 | 6.940 | | |
| S7 STO | STANDARD | Infinity | 0.302 | | |
| S8 | STANDARD | −37.799 | 1.75 | 1.788 | 47.508 |
| S9 | STANDARD | −15.340 | 0.1 | | |
| S10 | STANDARD | 81.215 | 4.0 | 1.618 | 63.417 |
| S11 | STANDARD | −7.678 | 1 | 1.847 | 23.791 |
| S12 | STANDARD | −25.705 | 6.139 | | |
| S13 | STANDARD | 35.226 | 3 | 1.618 | 63.417 |
| S14 | STANDARD | −35.226 | 9.4 | | |
| S15 | STANDARD | INFINITY | 1 | 1.517 | 64.212 |
| S16 | STANDARD | INFINITY | 1 | | |

Example 13

FIG. 13 shows the example 13 of the present invention. Example 13 is a 5 element design. Counting from the left side 1301, which is also the object side, the first element 1302 is a glass meniscus lens with negative power. The second element 1303 is an aspheric element preferably made by injection molding of suitable plastic material. The third element 1304 is a bi-convex or plano-convex element with positive power. The aperture stop 1305 follows the 3rd element. The fourth element 1306 and fifth elements 1307 form a cemented doublet where the power of the fourth element is positive and fifth negative. The right surface 1308 of the fifth element is convex. The flat element 1309 in front of the image plane 1310 (the right most surface) is the cover glass of the sensor.

Tables 13A and 13B shows the detailed prescription of this example. This table follows the conventions used by Zemax optical design software. The prescription is for a lens with an effective focal length of 1.4 mm and f/#2.2. The design can be scaled to other effective focal lengths.

TABLE 13A

Optical Prescription for Example 13

| Surf | Type | Radius (mm) | Thickness (mm) | Index | Abbe |
|---|---|---|---|---|---|
| Object | | | | | |
| S1 | STANDARD | 19.484 | 1 | 1.73 | 49.59 |
| S2 | STANDARD | 4.276 | 3.500 | | |
| S3 | EVENASPH | −10.009 | 1 | 1.534 | 56.20 |
| S4 | EVENASPH | 4.029 | 1.618 | | |
| S5 | STANDARD | INFINITY | 2.5 | 1.847 | 23.8 |
| S6 | STANDARD | −7.860 | 5.087 | | |
| S7 STO | STANDARD | Infinity | 1.093 | | |
| S8 | EVENASPH | 3.060 | 2.210 | 1.535 | 56.20 |
| S9 | STANDARD | −2.3 | 1.816 | 1.633 | 23.33 |
| S10 | EVENASPH | −4.342 | 2.8 | | |
| S11 | STANDARD | Infinity | 0.4 | 1.516 | 64.12 |
| S12 | STANDARD | INFINITY | 0.127 | | |

TABLE 13b

Aspheric constants for Example 13

| | | |
|---|---|---|
| Surface 3 S3 | Coeff r2 | 0 |
| | Coeff r4 | 0.00303 |
| | Coeff r6 | −0.000179 |
| | Coeff r8 | 3.111E−06 |
| | Coeff r10 | 0 |
| | Coeff r12 | 0 |
| | Coeff r14 | 0 |
| | Coeff r16 | 0 |
| Surface 4 S4 | Coeff r2 | 0 |
| | Coeff r4 | 0.00112 |
| | Coeff r6 | −0.000383 |
| | Coeff r8 | 0 |
| | Coeff r10 | 0 |
| | Coeff r12 | 0 |
| | Coeff r14 | 0 |
| | Coeff r16 | 0 |
| Surface 8 S8 | Coeff r2 | 0 |
| | Coeff r4 | −0.000998 |
| | Coeff r6 | 0.000619 |
| | Coeff r8 | 0 |
| | Coeff r10 | 0 |
| | Coeff r12 | 0 |
| | Coeff r14 | 0 |
| | Coeff r16 | 0 |
| Surface 10 S10 | Coeff r2 | 0 |
| | Coeff r4 | 0.00801 |
| | Coeff r6 | 0.00214 |
| | Coeff r8 | 0 |
| | Coeff r10 | 0 |
| | Coeff r12 | 0 |
| | Coeff r14 | 0 |
| | Coeff r16 | 0 |

Summary

Low ghosting wide-angle lens designs are presented. The dimensions and materials are selected such that the lens has a field of view of at least 145 degrees, f# of 2.2-2.9 and all secondary images of an object imaged on the image plane are focused such that they fall either outside of the image plane thus having a relative intensity that is less than $10^{-4}$ times the intensity of the primary image.

In one embodiment a set of conditional expressions are all met. In another embodiment the conditional expressions are all met and the conditional expressions related to the physical size of the lens is narrowed. In another embodiment five and seven element designs are produced.

Those skilled in the art will appreciate that various adaptations and modifications including scaling of the preferred embodiments can be configured without departing from the scope and spirit of the invention. Therefore, it is to be understood that the invention may be practiced other than as specifically described herein, within the scope of the appended claims.

What is claimed is:

1. A lens forming primary and secondary images, said images having focal planes and peak intensities, said lens comprising lens elements, said lens elements made of materials and having dimensions and locations, and said lens elements in order from object to image comprising: a) a first meniscus lens element with negative power, b) a second lens element with negative power having a concave image surface, c) a third lens element with positive power, d) an aperture stop, e) a lens group comprising a positive power lens element and a negative power lens element wherein the positive and negative lens elements form a cemented doublet and the image surface of the negative lens element is flat or convex and it is made from an optical material having an Abbe number less than 24, wherein the materials, dimensions and locations of the lens elements are selected such that the focal plane of the secondary images are not coincident with the focal plane of the primary image, and wherein said lens has a field of view of at least 145 degrees.

2. The lens of claim 1 said lens further satisfying the formula:

$$7 =< TTL/EFL <= 20,$$

where TTL is the total distance from the vertex of the object side of the first lens to the image plane when the lens is focused at infinity and EFL is the effective focal length of the lens.

3. The wide-angle lens of claim 1 wherein the wide-angle lens is made according to the prescription contained in Table 1.

4. The wide-angle lens of claim 1 further comprising the prescription contained in Table 1.

5. The wide-angle lens of claim 1 further comprising the prescription contained in Table 2.

6. The wide-angle lens of claim 1 wherein the wide-angle lens is made according to the prescription contained in Table 2.

7. The wide-angle lens of claim 1 wherein the wide-angle lens is made according to the prescription contained in Table 3A and 3B.

8. The wide-angle lens of claim 1 wherein the wide-angle lens is made according to the prescription contained in Table 4A and 4B.

9. The wide-angle lens of claim 1 wherein the wide-angle lens is made according to the prescription contained in Table 5A and 5B.

10. The wide-angle lens of claim 1 wherein the wide-angle lens is made according to the prescription contained in Table 6A and 6B.

11. The wide-angle lens of claim 1 wherein the wide-angle lens is made according to the prescription contained in Table 7A and 7B.

12. The wide-angle lens of claim 1 wherein the wide-angle lens is made according to the prescription contained in Table 8A and 8B.

13. The wide-angle lens of claim 1 wherein the wide-angle lens is made according to the prescription contained in Table 9A and 9B.

14. The wide-angle lens of claim 1 wherein the wide-angle lens is made according to the prescription contained in Table 10A and 10B.

15. The wide-angle lens of claim 1 wherein the wide-angle lens is made according to the prescription contained in Table 11A and 11B.

16. The wide-angle lens of claim 1 wherein the wide-angle lens is made according to the prescription contained in Table 12.

17. The wide-angle lens of claim 1 wherein the wide-angle lens is made according to the prescription contained in Table 13A and 13B.

18. A low ghosting wide-angle lens comprising in order from object to image: a) a first negative power meniscus lens element having a convex object surface and concave image surface, b) a second negative power lens element having a concave image surface, c) a third positive power lens element, d) an aperture stop, e) a lens group comprising of a positive power element and a negative power element wherein the positive and negative elements form a cemented doublet and the image surface of the negative element is flat or convex and it is made from an optical material having an Abbe number less than 24, f) a sixth positive power lens element, and wherein said wide-angle lens has a field of view of at least 145 degrees.

19. The wide-angle lens of claim 18 wherein the ratio of the total track length of the wide-angle lens to its effective focal length when the lens is focused at infinity is between 8 and 10.

20. The wide-angle lens of claim 18 wherein the sixth element has an object surface that is concave, aspheric and flat at its vertex and a convex image surface.

21. The wide-angle lens of claim 20 wherein the absolute curvature of the image surface of the sixth element measured at the vertex divided by the focal length of the wide-angle lens is between 1.5 and 2.5.

22. The wide-angle lens of claim 18 wherein the wide-angle lens is made according to a prescription selected from the prescriptions contained in Tables 1, 2, 3A and 3B, 4A and 4B, 5A and 5B, 6A and 6B, 7A and 7B, 8A and 8B, 9A and 9B, 10A and 10B, 11A and 11B, and 12.

23. A lens having an image plane, said lens comprising in order from object to image: a) a first meniscus lens element with negative power, b) a second lens element with negative power having a concave image surface, c) a third element with positive power, d) an aperture stop, e) a lens group comprising of a positive power element and a negative power element wherein the positive and negative elements form a cemented doublet, said lens forming a primary and secondary images of an object said images having peak intensities wherein the materials, dimensions and locations of the elements are selected such that the ratios of the peak intensity of secondary images to that of the primary image is $=<10^{-6}$, and wherein said lens has a field of view of at least 145 degrees.

24. The wide-angle lens of claim 23 wherein the wide-angle lens is made according to a prescription selected from the prescriptions contained in Tables 1, 2, 3A and 3B, 4A and 4B, 5A and 5B, 6A and 6B, 7A and 7B, 8A and 8B, 9A and 9B, 10A and 10B, 11A and 11B, 12, and, 13A and 13B.

* * * * *